(12) United States Patent
Nishikori et al.

(10) Patent No.: US 8,430,472 B2
(45) Date of Patent: Apr. 30, 2013

(54) PRINTING APPARATUS AND PRINTING METHOD

(75) Inventors: Hitoshi Nishikori, Inagi (JP); Norihiro Kawatoko, Yokohama (JP); Yutaka Kano, Yokohama (JP); Yuji Konno, Kawasaki (JP); Tomokazu Ishikawa, Kawasaki (JP); Akitoshi Yamada, Yokohama (JP); Mitsuhiro Ono, Tokyo (JP); Rie Kajihara, Higashikagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/748,989

(22) Filed: Mar. 29, 2010

(65) Prior Publication Data

US 2010/0245446 A1    Sep. 30, 2010

(30) Foreign Application Priority Data

Mar. 31, 2009    (JP) .................. 2009-087190

(51) Int. Cl.
*B41J 2/205* (2006.01)
*B41J 29/38* (2006.01)
*B41J 29/393* (2006.01)
*B41J 2/165* (2006.01)
*B41J 2/145* (2006.01)

(52) U.S. Cl.
USPC .............................................. 347/15

(58) Field of Classification Search ............ None
See application file for complete search history.

(56) References Cited

U.S. PATENT DOCUMENTS

| | | | |
|---|---|---|---|
| 5,594,478 A | 1/1997 | Matsubara et al. | |
| 5,832,184 A | 11/1998 | Konno et al. | |
| 5,980,012 A | 11/1999 | Fujita et al. | |
| 6,120,129 A | 9/2000 | Iwasaki et al. | |
| 6,145,950 A | 11/2000 | Ohtsuka et al. | |
| 6,158,836 A | 12/2000 | Iwasaki et al. | |
| 6,260,938 B1 | 7/2001 | Ohtsuka et al. | |
| 6,267,467 B1 * | 7/2001 | Otsuki ........................ | 347/43 |
| 6,328,403 B1 | 12/2001 | Iwasaki et al. | |
| 6,364,446 B1 | 4/2002 | Ishikawa et al. | |
| 6,371,592 B1 | 4/2002 | Otsuka et al. | |
| 6,390,586 B1 | 5/2002 | Takahashi et al. | |
| 6,543,872 B2 | 4/2003 | Ohtsuka et al. | |
| 6,585,353 B1 | 7/2003 | Kanematsu et al. | |
| 6,601,938 B1 | 8/2003 | Iwasaki et al. | |

(Continued)

FOREIGN PATENT DOCUMENTS

| | | |
|---|---|---|
| JP | 5-031922 A | 2/1993 |
| JP | 10-081025 A | 3/1998 |

(Continued)

*Primary Examiner* — Stephen Meier
*Assistant Examiner* — Alexander C Witkowski
(74) *Attorney, Agent, or Firm* — Fitzpatrick, Cella, Harper & Scinto

(57) ABSTRACT

In a 2M-pass printing operation that forms dots including overlapping dots, this invention makes an arrangement to ensure that the number of overlapping dots that are printed in a unit area in pairs of passes each straddling a print medium convey operation executed between an Mth pass and an (M+1)st pass is greater than the number of overlapping dots that are printed in pairs of passes straddling any other convey operation. This arrangement can cause two dots of the overlapping dots to be separated from each other in the event of a print position misalignment, preventing a possible density fall even in a unit area where the largest density reduction is feared to occur at time of the print position misalignment.

14 Claims, 29 Drawing Sheets

U.S. PATENT DOCUMENTS

| | | |
|---|---|---|
| 6,733,100 B1 | 5/2004 | Fujita et al. |
| 6,860,578 B2 | 3/2005 | Yamada et al. |
| 6,877,833 B2 | 4/2005 | Teshigawara et al. |
| 6,899,413 B2 | 5/2005 | Otsuka et al. |
| 6,963,423 B2 | 11/2005 | Ogasahara et al. |
| 6,991,316 B2 | 1/2006 | Maru et al. |
| 7,011,391 B2 | 3/2006 | Otsuka et al. |
| 7,048,356 B2 | 5/2006 | Ishikawa et al. |
| 7,057,756 B2 | 6/2006 | Ogasahara et al. |
| 7,125,095 B2 | 10/2006 | Yamada et al. |
| 7,131,713 B2 | 11/2006 | Otsuka et al. |
| 7,192,112 B2 | 3/2007 | Nakanishi et al. |
| 7,192,114 B2 | 3/2007 | Suzuki et al. |
| 7,258,412 B2 | 8/2007 | Maru et al. |
| 7,261,387 B2 | 8/2007 | Nishikori et al. |
| 7,287,830 B2 | 10/2007 | Ide et al. |
| 7,290,855 B2 | 11/2007 | Chikuma et al. |
| 7,325,900 B2 | 2/2008 | Hayashi et al. |
| 7,404,612 B2 | 7/2008 | Takamiya et al. |
| 7,408,676 B2 | 8/2008 | Yazawa et al. |
| 7,455,379 B2 | 11/2008 | Otsuka et al. |
| 7,515,318 B2 | 4/2009 | Nishikori et al. |
| 7,651,194 B2 | 1/2010 | Yazawa et al. |
| 7,661,786 B2 | 2/2010 | Nakazawa et al. |
| 7,690,744 B2 | 4/2010 | Nakanishi et al. |
| 7,699,430 B2 | 4/2010 | Takamiya et al. |
| 7,706,023 B2 | 4/2010 | Kanda et al. |
| 2002/0001489 A1 | 1/2002 | Ozaki et al. |
| 2002/0021319 A1 | 2/2002 | Kawatoko et al. |
| 2005/0001866 A1* | 1/2005 | Eguchi et al. .................. 347/15 |
| 2007/0008361 A1 | 1/2007 | Kawatoko et al. |
| 2007/0132805 A1 | 6/2007 | Nakanishi et al. |
| 2007/0273720 A1 | 11/2007 | Yasutani et al. |
| 2007/0273899 A1 | 11/2007 | Yazawa et al. |
| 2008/0143772 A1 | 6/2008 | Konno et al. |
| 2008/0252677 A1 | 10/2008 | Tajika et al. |
| 2009/0116069 A1 | 5/2009 | Nishikori et al. |
| 2009/0315934 A1 | 12/2009 | Moriyama et al. |

FOREIGN PATENT DOCUMENTS

| | | |
|---|---|---|
| JP | 2001-322262 A | 11/2001 |
| JP | 2002-014552 A | 1/2002 |
| JP | 2002-029097 A | 1/2002 |
| JP | 2002-144637 A | 5/2002 |

* cited by examiner

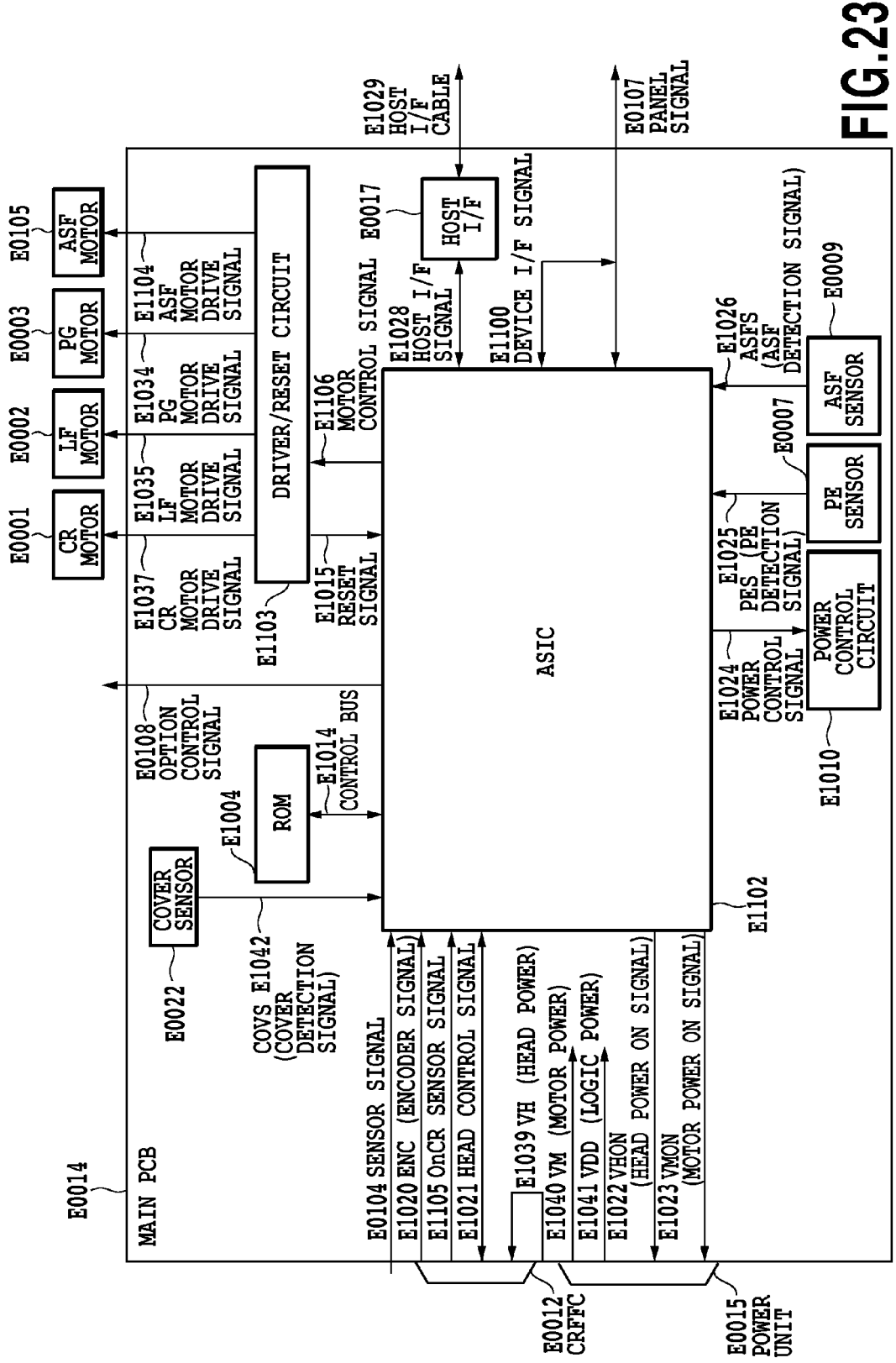

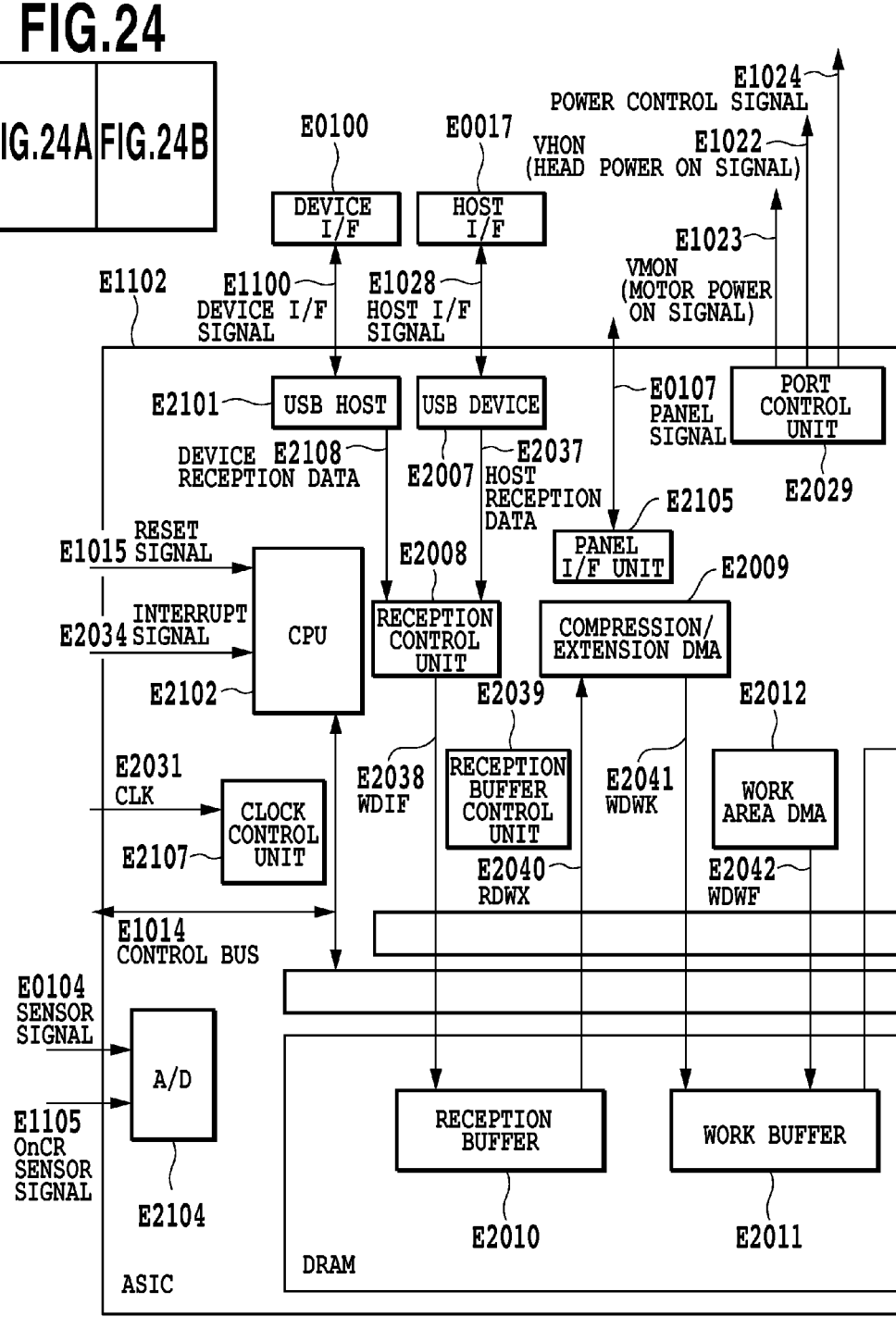

PRINTING APPARATUS AND PRINTING METHOD

BACKGROUND OF THE INVENTION

1. Field of the Invention

The present invention relates to a printing apparatus and a printing method that cause a print head having ink-ejecting nozzles to print on a print medium as it scans over the print medium.

2. Description of the Related Art

Inkjet printing apparatus uses a print head having a plurality of ink-ejecting printing elements (or nozzles) and performs a printing operation by repeating a print scan that causes the print head to squirt ink as it moves over the print medium. Among a plurality of nozzles there are some unavoidable variations in an ink ejection volume and in an ejection direction. These variations may result in a density unevenness and stripes showing up in a printed image.

As a method of alleviating such troubles as density unevenness and stripes, multi-pass printing has been known, for example, as disclosed in Japanese Patent Laid-Open No. H05-031922 (1993). Multi-pass printing divides binary image data for a unit area of a print medium into pieces of image data to be printed one in each of a plurality of print scans and then successively prints the divided pieces of image data in a plurality of print scans, with a print medium convey operation interposed between adjoining print scans. With this arrangement, dots printed by one and the same nozzle are not formed in succession in the print scan direction of the print head, which in turn can spread ejection characteristic variations, if any, of individual nozzles over a wide area. As a result, a uniform and smooth image can be obtained.

As described above, the multi-pass printing needs to divide binary image data into pieces for the multiple passes or print scans. Generally, such a dividing operation often uses a mask pattern composed of a matrix of printable pixels (1) each of which permits a dot to be formed therein and unprintable pixels (0) each of which does not permit a dot to be printed therein. In that case, a logical computation is performed between the binary image data to be printed in each unit area of the print medium and the mask pattern, dividing the binary image data for the unit area into pieces of binary image data that are to be printed in the multiple print scans.

The mask pattern is generally arranged so that the printable pixels (1) assigned to a plurality of print scans are in a complementary relationship. That is, those pixels that are determined by binary image data as being printable (1) are each formed with a single dot in one of the multiple print scans. This arrangement is designed to preserve, even after the dividing operation, the image information that has existed before the dividing operation.

In recent years, however, density changes caused by dot position (or registration) misalignment among multiple print scans have come to be spotlighted as a newly recognized issue.

FIG. 3 is a conceptual diagram showing how a print position misalignment occurs when a 4-pass printing is performed. In a 4-pass printing, unit areas on a print medium are each printed with a plurality of dots in each of the four print scans. The plurality of dots printed in each of the multiple print scans can be taken as a dot group formed on a single plane as shown. Then, a print position misalignment between different print scans over the same unit area can be regarded as a relative position misalignment among dot groups printed in different print scans, i.e., as a misalignment between different planes. For example, when a print medium conveyance error occurs in a unit area of interest between a first pass and a second pass, only a plane corresponding to the first pass is placed out of alignment with the second and third plane. Such a print position misalignment can be triggered unexpectedly by a change in a distance between a print medium and a nozzle face of the print head (head-medium distance) or by a change in the distance that a print medium is conveyed.

Such a print position misalignment, when it occurs, causes many of the dots, that are determined by the mask pattern to be printed at different positions in different print scans, to overlap each other. As a result, the dot coverage ratio on the print medium (or area factor) decreases, lowering the density in the unit area. Further, if unit areas with such print position misalignments and those with no such misalignments are intermingled on the same print medium, the above phenomenon is perceived as a density unevenness.

SUMMARY OF THE INVENTION

The present invention has been accomplished to overcome the above problem. It is therefore an object of this invention to provide a printing apparatus and a printing method which, even if print position misalignments among a plurality of print scans, particularly those caused by a print medium conveying operation, should occur unexpectedly while performing a multi-pass printing, can minimize variations in density among unit areas and thereby produce an image with little density unevenness.

The first aspect of the present invention is A printing apparatus, comprising: a printing unit, which uses a print head that prints dots of the same color, and which prints an image on a print medium by causing the print head to print scan a unit area of the print medium 2M times (M is an integer equal to or greater than 2); and a print control unit configured to cause the print head to perform a print operation such that the number of overlapping dots, composed of dots printed at the same subpixel, in the print scan before the M+1th print scan and in the print scan after the Mth print scan, is greater than the number of overlapping dots, composed of dots printed at the same subpixel, in the print scan before the N+1th print scan (N is a positive integer different from N and less than 2M) and in the print scan after the Nth print scan.

The second aspect of the present invention is a printing method comprising the steps of printing an image on a print medium using a print head that prints dots of the same color by causing the print head to print scan a unit area of the print medium 2M times (M is an integer equal to or greater than 2); and controlling the print head to perform a print operation such that the number of overlapping dots, composed of dots printed at the same subpixel, in the print scans before the M+1th print scan and in the print scans after the Mth print scan, is greater than the number of overlapping dots, composed of dots printed at the same subpixel, in the print scans before the N+1th print scan and in the print scans after the Nth print scan (N is a positive integer different from N and less than 2M).

Further features of the present invention will become apparent from the following description of exemplary embodiments (with reference to the attached drawings).

BRIEF DESCRIPTION OF THE DRAWINGS

FIG. 23 is a block diagram showing an internal construction of a main PCB E0014;

FIG. 24 is a diagram showing the relationship of FIGS. 24A and 24B;

FIG. 24A is a block diagram showing an example internal configuration of an ASIC;

DESCRIPTION OF THE EMBODIMENTS

First Embodiment

Now, a first embodiment of this invention will be described in detail. First, a construction of an inkjet printing apparatus applied to this embodiment will be explained.

(Construction of Mechanism)

A body of the printing apparatus in this embodiment can be classified in terms of function into a feeder section, a print medium conveying section, a discharging section, a carriage section, a cleaning section and an enclosure. Outlines of these will be explained in the following.

(A) Feeder Section

Figure 17:
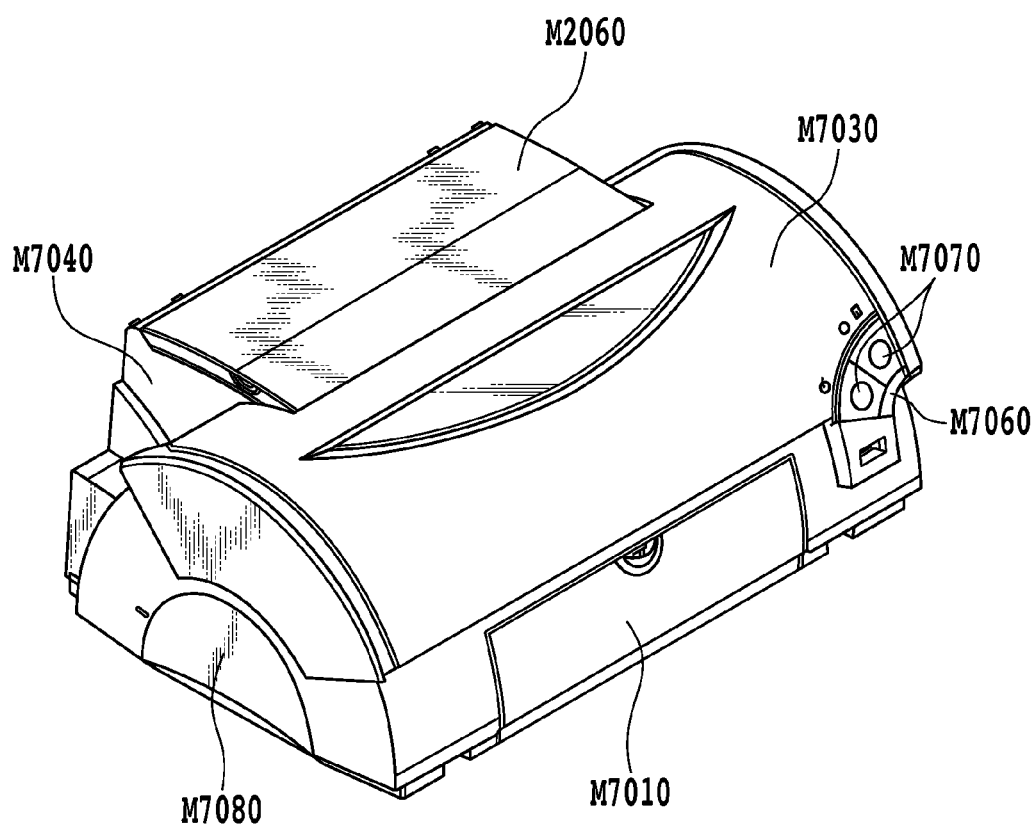
FIG. 17 is a perspective view of a printing apparatus applied to an embodiment of this invention when not in use.
Figure 18:
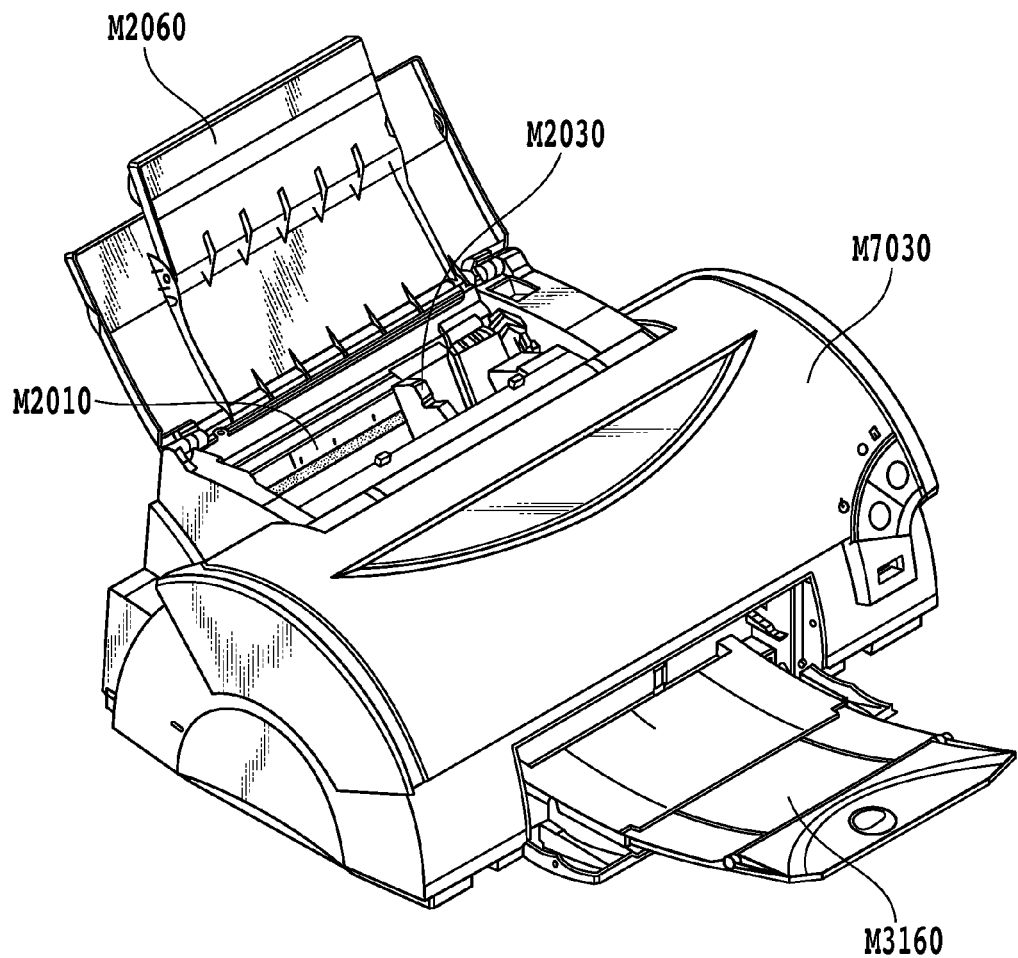
FIG. 18 is a perspective view of the printing apparatus applied to an embodiment of this invention when in use.
Figure 19:
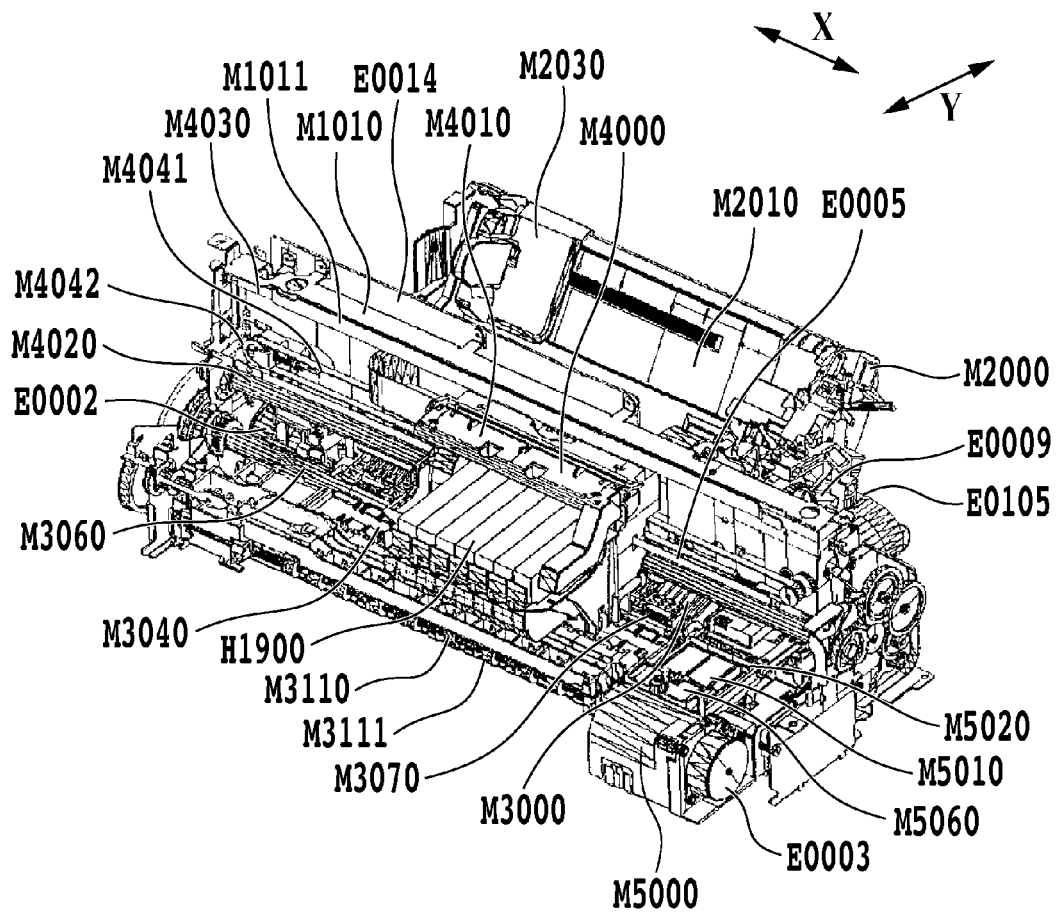
FIG. 19 is a perspective view showing an internal mechanism of the printing apparatus applied to an embodiment of this invention.
Figure 20:
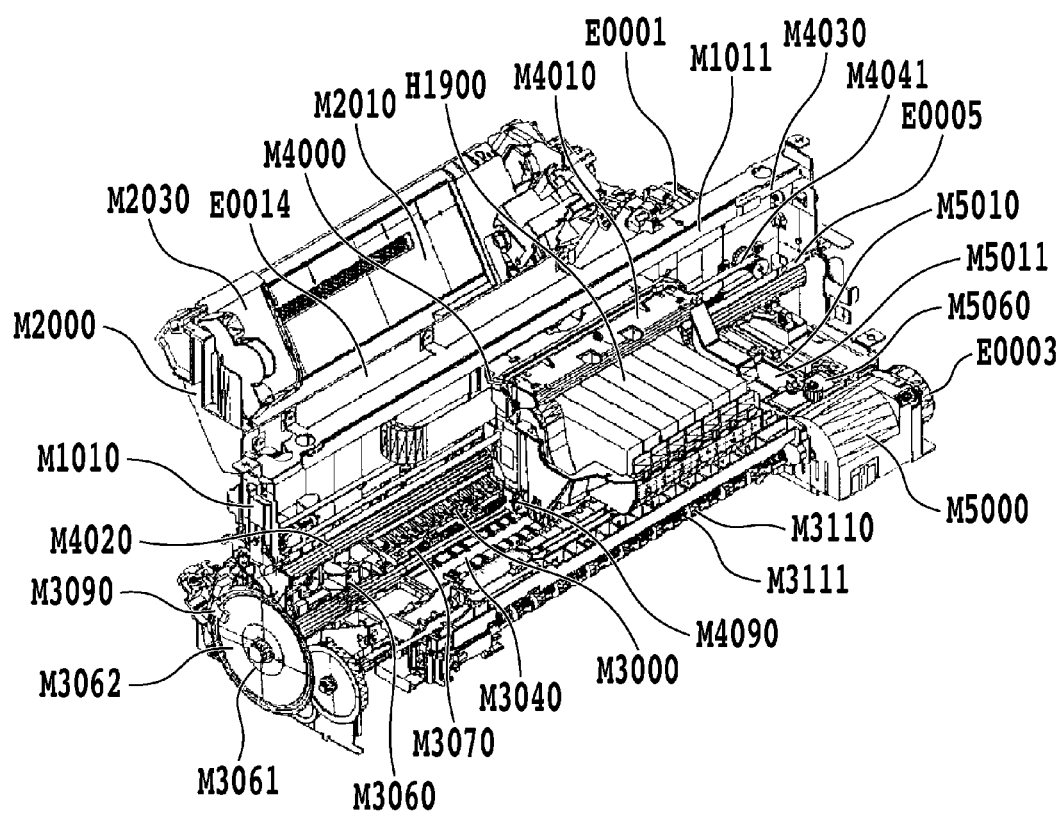
FIG. 20 is a perspective view showing an internal mechanism of the printing apparatus applied to an embodiment of this invention.
Figure 21:
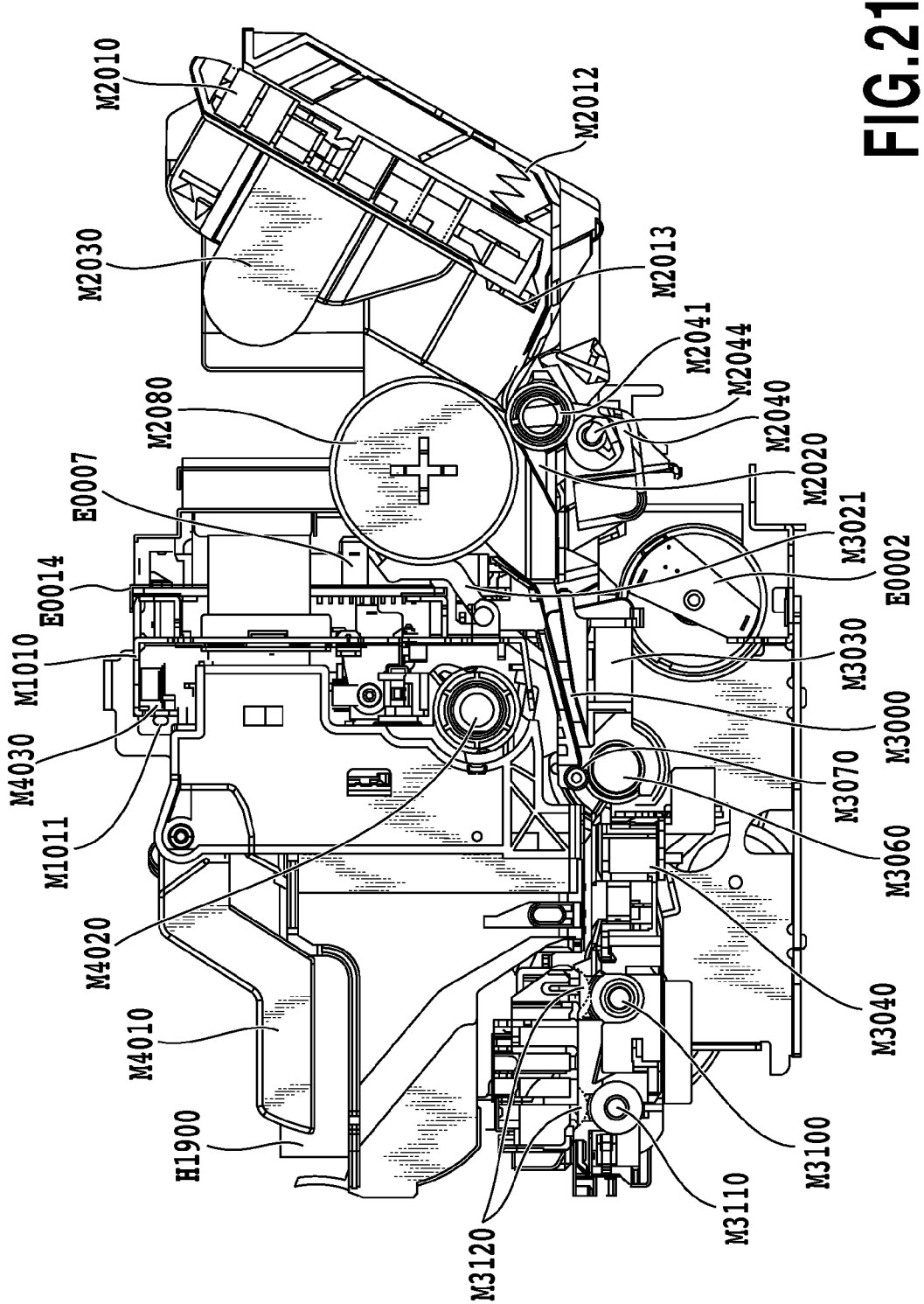
FIG. 21 is a side cross-sectional view showing an internal mechanism of the printing apparatus applied to an embodiment of this invention.

FIGS. 17 and 18 are perspective views showing a printing apparatus applied to this embodiment, with FIG. 17 representing a state of the printing apparatus M1 when not in use and FIG. 18 a state of the printing apparatus M1 when in use. FIGS. 19, 20 and 21 show an internal mechanism in the printing apparatus body, with FIG. 19 representing a perspective view as seen from right above, FIG. 20 representing a perspective view as seen from left above and FIG. 21 representing a side cross-sectional view of the printing apparatus body.

Referring to FIGS. 17-21, the feeder section has a pressure plate M2010 on which sheets of print medium are stacked, a feed roller M2080 for feeding the print medium one sheet at a time, a separation roller M2041 for separating sheets, a reverse lever M2020 for returning the print medium back to the stack position, and others, all these components mounted on a base M2000.

The base M2000 or an enclosure is provided with a feed tray M2060 for holding a stack of print medium sheets. The feed tray M2060 is of a multi-foldable type and rotated open for use.

The feed roller M2080 is shaped like a rod circular in cross section. One separation roller rubber is provided near a paper reference side to feed print medium sheets. A drive force for the feed roller M2080 is transmitted from a dedicated ASF motor E0105 installed in the feeder section via a drive transmission gear and a planetary gear not shown.

The pressure plate M2010 has a movable side guide M2030 that restricts a stack position of the print medium. The pressure plate M2010 is rotatable about a rotating shaft coupled to the base M2000 and urged by a pressure plate spring M2012 against the feed roller M2080. At a portion of the pressure plate M2010 that faces the feed roller M2080, there is a separation sheet M2013 made of a material with a large frictional coefficient, such as artificial leather. The pressure plate M2010 is brought into or out of contact with the feed roller M2080 by a pressure plate cam.

On the base M2000 is mounted a separation roller holder M2040 that has the separation roller M2041 for separating one sheet at a time from the print medium stack and which is rotatable about a rotating shaft installed on the base M2000. The separation roller holder M2040 is biased by a separation roller spring not shown toward the feed roller M2080. The separation roller M2041 is provided with a clutch not shown that, when applied more than a predetermined load, allows a portion mounted with the separation roller M2041 to rotate. The separation roller M2041 can be brought into and out of contact with the feed roller M2080 by a separation roller release shaft M2044 and a control cam not shown. The positions of the pressure plate M2010, the reverse lever M2020 and the separation roller M2041 are detected by an auto sheet feed sensor (hereinafter referred to as an ASE sensor) E0009.

The reverse lever M2020 for brining the print medium back to the stack position is rotatably mounted on the base M2000 and biased in a release direction by a reverse lever spring not shown. To return the print medium sheet, the reverse lever M2020 is rotated by the control cam.

The process of feeding a print medium sheet in the above construction will be explained as follows.

In a normal standby state, the pressure plate M2010 is released by the pressure plate cam and the separation roller M2041 is also released by the control cam. The reverse lever M2020 has the print medium set in a retracted position and is provided at a stack position to close a stack port to prevent a stack of print medium sheets from entering into the inside.

When a sheet is fed, first the separation roller M2041 is driven by a motor to engage with the feed roller M2080. Then the reverse lever M2020 is released to allow the pressure plate M2010 to engage with the feed roller M2080. In this state, the print medium sheets begin to be fed. The print medium sheets are restricted by a front separation portion, not shown, mounted on the base M2000, allowing only a predetermined number of sheets to be delivered to a nip portion that is constructed of the feed roller M2080 and the separation roller M2041. At the nip portion, only the uppermost sheet is separated from the remaining sheets and conveyed further.

When the sheet reaches a print medium conveying roller M3060 and a pinch roller M3070, the pressure plate M2010 is released by the pressure cam not shown and the separation roller M2041 by the control cam. The reverse lever M2020 is returned to the stack position by the control cam, bringing the remaining print medium sheets, that have reached the nip portion composed of the feed roller. M2080 and the separation roller M2041, back to the stack position.

(B) Print Medium Conveying Section

On a chassis M1010 formed of a bent-up metal plate are pivotally mounted a print medium conveying roller M3060 and a paper end sensor (PE sensor) E0007. The print medium conveying roller M3060 is a metal shaft coated on its surface with fine ceramic particles and supported at its both ends by bearings not shown that are secured to the chassis M1010. Between the bearings and the print medium conveying roller M3060 there is a roller tension spring not shown that biases the print medium conveying roller M3060 so that the roller is properly loaded during rotation to ensure a stable print medium convey operation.

The print medium conveying roller M3060 has a plurality of pinch rollers M3070 in contact therewith so that they are rotated by the conveying roller. The pinch rollers M3070 are held by a pinch roller holder M3000 and pressed against the conveying roller M3060 by a pinch roller spring not shown to generate a print medium conveying force. At this time, the pinch roller holder M3000 is rotated about its shaft supported by bearings on the chassis M1010.

At the entrance toward which a print medium sheet is conveyed, there are a paper guide flapper M3030 to guide the sheet and a platen M3040. The pinch roller holder M3000 is provided with a PE sensor lever M3021 which informs the PE sensor E0007 of the detection of front and rear end of the print medium. The platen M3040 is mounted and positioned on the chassis M1010. The paper guide flapper M3030 is rotatable about bearing portions not shown and positioned when it engages with the chassis M1010. The bearing portions engage with and slide on the print medium conveying roller M3060.

Downstream of the conveying roller M3060 in the print medium conveying direction, there is a print head H1001 described later.

A print medium conveying process in the above construction will be explained as follows. A print medium fed to the paper conveying section is guided by the pinch roller holder M3000 and the paper guide flapper M3030 and conveyed to a roller pair of the print medium conveying roller M3060 and the pinch rollers M3070. At this time, the PE sensor lever M3021 detects the front end of the print medium and thus the print position of the print medium is already determined. The roller pair made up of the conveying roller M3060 and the pinch rollers M3070 is rotated by an LF motor E0002 to move the print medium over the platen M3040. The platen M3040 is formed with ribs that constitute a conveyance reference plane. The ribs control a gap between the print head H1001 and the print medium surface. At the same time, in cooperation with a discharging section described later, the ribs also have a function of preventing the print medium from undulation. The platen M3040 has a sponge portion not shown. When the front and rear end portion of the print medium are printed, an image is formed by using nozzles at a position corresponding to the sponge portion.

A drive force to rotate the print medium conveying roller M3060 is derived from a rotating force of the LF motor E0002, constructed, for instance, of a DC motor, which is transmitted through a timing belt not shown to a pulley 3061 mounted on the shaft of the conveying roller M3060. Also mounted on the shaft of the conveying roller M3060 is a code wheel M3062 that detects a distance that the print medium is conveyed by the conveying roller M3060. Further, on the adjoining chassis M1010 is installed an encode sensor M3090 to read a marking on the code wheel M3062. The marking on the code wheel M3062 is formed at a pitch of 150-300 lpi (lines/inch).

(C) Discharging Section

The paper discharging section comprises a first paper discharging roller M3100, a second paper discharging roller M3110, a plurality of spurs M3120 and a gear train.

The first paper discharging roller M3100 is constructed of a metal shaft having a plurality of rubber portions. The first paper discharging roller M3100 is driven by the print medium conveying roller M3060 whose drive force is transmitted through idler gears to the first discharging roller M3100.

The second paper discharging roller M3110 is constructed of a resin shaft having a plurality of elastomer elastic members M3111 attached thereto. The second paper discharging roller M3110 is driven by a drive force of the first paper discharging roller M3100 being transmitted through idler gears.

The spur M3120 is a circular thin plate of, say, SUS having a plurality of protrusions formed along its circumference and which is formed integral with a resin portion. A plurality of such spurs M3120 are mounted on a spur holder. The spurs are held to the spur holder by spur springs that are rod-like coil springs. The spur springs also presses the spurs M3120 against the paper discharging rollers M3100 and M3110 with a predetermined pressure. In this construction the spurs M3120 are rotated by the two discharging rollers M3100, M3110. Some of the spurs M3120 are installed at positions of the rubber portion of the first paper discharging roller M3100 or of the elastic members M3111 of the second paper discharging roller M3110 and have a function of mainly generating a print medium conveying force. Some other spurs are installed at other positions where the rubber or elastic members M3111 are not installed, and have a function of mainly preventing a print medium from floating during printing.

The gear train transmits a drive force of the print medium conveying roller M3060 to the paper discharging rollers M3100, M3110.

Between the first paper discharging roller M3100 and the second paper discharging roller M3110 there is a paper end support not shown. The paper end support lifts both ends of the print medium to hold it beyond the first paper discharging roller M3100 in order to protect a printed image formed on the print medium against being rubbed by the carriage. More specifically, a resin member, not shown, having a roller at its end is urged by a paper end support spring, not shown, to press its roller against the print medium with a predetermined pressure, lifting the ends of the print medium to make it stiff enough to hold itself in an end-lifted posture.

In the above construction the print medium formed with an image is held by the nip, made up of the first paper discharging roller M3100 and the spurs M3120, and then conveyed to a paper discharging tray M3160 from which it is discharged. The paper discharging tray M3160 is divided into a plurality of smaller trays that can be accommodated under a lower case M7080 described later. The paper discharging tray M3160 is drawn out for use. The paper discharging tray M3160 rises in height toward the front end, with its sides held higher than other part, improving the ability of discharged sheets of print medium to be stacked and preventing their printed surface from being rubbed and smeared.

(D) Carriage Section

The carriage section has a carriage M4000 in which to install the print head H1001. The carriage M4000 is supported by a guide shaft M4020 and a guide rail M1011. The guide shaft M4020 is secured to the chassis M1010 and guides and supports the carriage M4000 so that it can reciprocally print scan in a direction perpendicular to the print medium conveying direction. The guide rail M1011 is formed integral with the chassis M1010 and holds the rear end of the carriage M4000 in a way that keeps a gap between the print head H1001 and the print medium constant. The guide rail M1011 has its side on which the carriage M4000 slides lined with a slide sheet M4030 of, for example, a thin stainless plate to reduce sliding noise of the carriage.

The carriage M4000 is driven by a carriage motor E0001 mounted on the chassis M1010 via a timing belt M4041. The timing belt M4041 is supported in a tensed state by an idle pulley M4042. Further, the timing belt M4041 is connected to the carriage M4000 through a carriage damper formed of, for example, rubber to reduce oscillations of the carriage motor E0001 and others and therefore unevenness of an image being printed.

An encoder scale E0005 to detect the position of the carriage M4000 is installed parallel to the timing belt M4041. The encoder scale E0005 is formed with markings at a pitch of 150-300 lpi. An encoder sensor E0004 (described later with reference to FIG. 22) to read the markings is installed on a carriage printed circuit board E0013 (described later with reference to FIG. 22) mounted on the carriage M4000. The carriage PCB E0013 also has a head contact E0101 to make an electrical connection with the print head H1001. Further, the carriage M4000 is connected with a flexible cable E0012 not shown to transmit a drive signal from a main PCB E0014, a printed circuit board, to the print head H1001.

To secure the print head H1001 to the carriage M4000, the carriage M4000 is provided with an abutment portion that positions the print head H1001 on the carriage M4000 as the abutment portion presses the print head against the carriage. The carriage M4000 is also provided with a pressing means not shown to fix the print head H1001 at a predetermined position. The pressing means is mounted on a head set lever M4010 which, when the print head H1001 is set, is pivoted about its rotating center to cause the pressing means to act on and secure the print head H1001.

Further, the carriage M4000 is also provided with a position detection sensor M4090 constructed of a reflective optical sensor, which is designed to detect a position of a special media such as CD-R, a range of printed image and paper ends. The position detection sensor M4090 can detect the current position of the carriage M4000 by emitting light from its light emitting element and receiving a reflected light.

In the above construction, an image is formed on a print medium as follows. As for a line or row position, a roller pair of the print medium conveying roller M3060 and the pinch rollers M3070 conveys the print medium to a predetermined position. As for a column position, the carriage motor E0001 drives the carriage M4000 in a direction perpendicular to the paper conveying direction to move the print head H1001 to a target image forming position. The print head H1001 positioned in this way ejects ink onto the print medium in response to a signal from the main PCB E0014. While the detailed construction of the print head H1001 and the printing system will be described later, what is referred to as a print scan in the printing apparatus of this embodiment is an operation in which the carriage M4000 performs a scan in a column array direction (which crosses the print medium conveying direction) while causing the print head H1001 to execute printing. An operation in which a print medium is conveyed by the conveying roller M3060 in a row array direction, that crosses the print scan direction, is referred to as a subscan. Alternate execution of the print scan and the subscan is repeated until an image is completed on the print medium.

(E) Cleaning Section

The cleaning section comprises, for instance, a pump M5000 to clean the print head H1001, a cap M5010 to keep the print head H1001 from drying and a blade M5020 to clean a nozzle-formed face of the print head H1001. The cleaning section is provided with a dedicated cleaning motor E0003. The cleaning motor E0003 has a one-way clutch not shown, which, when rotated in one direction, activates the pump and, when rotated in the opposite direction, operates the blade M5020 and at the same time causes the cap M5010 to move up or down.

The pump M5000 generates a negative pressure by squeezing two tubes not shown with a pump roller not shown. The cap M5010 is connected with the pump M5000 through a valve not shown. The pump M5000, when operated with the cap M5010 kept in hermetic contact with the ink nozzle openings of the print head H1001, sucks out waste ink from the print head H1001. Further, the cap M5010 is provided at its inner side with a cap absorbing material M5011 that helps reduce the amount of ink remaining on the face of the print head H1001 after the sucking operation. The ink sucking operation is also done with the cap M5010 open to draw out ink remaining in the cap M5010 to prevent the residual ink from sticking to the cap and forestall possible troubles associated with the sticking ink. The waste ink sucked out by the pump M5000 is absorbed in a waste ink absorbing member in the lower case M7080 and held there.

A series of successive operations, including the operation of the blade M5020, the raise-lower operation of the cap M5010 and the open-close operation of the valve, is controlled by a main cam, not shown, made up of a plurality of cams mounted on a shaft. The main cam is acted upon by cams and arms of various parts to execute a predetermined action. The position of the main cam can be detected by a position detection sensor such as a photointerrupter. When the cap M5010 is lowered, the blade M5020 is moved perpendicularly with respect to the print scan direction of the carriage M4000 to clean the face of the print head H1001. The blade M5020 is made up of a plurality of blades, including one for cleaning parts of the print head face near the nozzles of the print head H1001 and one for cleaning the entire face of the print head. When the carriage M4000 has moved to the farthest position, the blade M5020 contacts a blade cleaner M5060 which in turn cleans the blade itself of the removed ink.

(F) Enclosure

The units explained in (A) to (F) are incorporated mainly into the chassis M1010 and together form a mechanical part of the printing apparatus. The enclosure encloses all these and comprises mainly a lower case M7080, an upper case M7040, an access cover M7030, and a connector cover and a front cover M7010.

Below the lower case M7080 is installed a paper discharging tray rail not shown in which to accommodate the divided paper discharging trays M3160. The front cover M7010 closes the paper discharge port when not in use.

The upper case M7040 is fitted with the access cover M7030 that can be pivoted open. The upper case has an opening in a part of its upper surface, through which an ink tank H1900 and the print head H1001 can be replaced. In the printing apparatus of this embodiment, the print head and the ink tank are constructed as a head cartridge, in which a plurality of print heads, each capable of ejecting a different color ink, are integrally formed into a print head unit whereas the ink tank H1900 has its individual ink tanks of different colors constructed independently removable. Further, the upper case is fitted with, for example, a door switch lever, not shown, to detect when the access cover is opened or closed, an LED guide M7060 to transmit and indicate an LED light, and a key switch M7070 that acts on switches (SW) on the printed circuit board. It is also fitted with a multi-foldable feed tray M2060 that can be pivoted open or closed. When the feeder section is not in use, the feed tray M2060 is folded and pivoted closed to serve as a cover for the feeder section. The upper case M7040 and the lower case M7080 are held together through elastic engagement claws, with a connector portion between them covered by a connector cover not shown.

(Electric Circuit Configuration)

Next, a configuration of electric circuitry in this embodiment will be explained.

Figure 22:
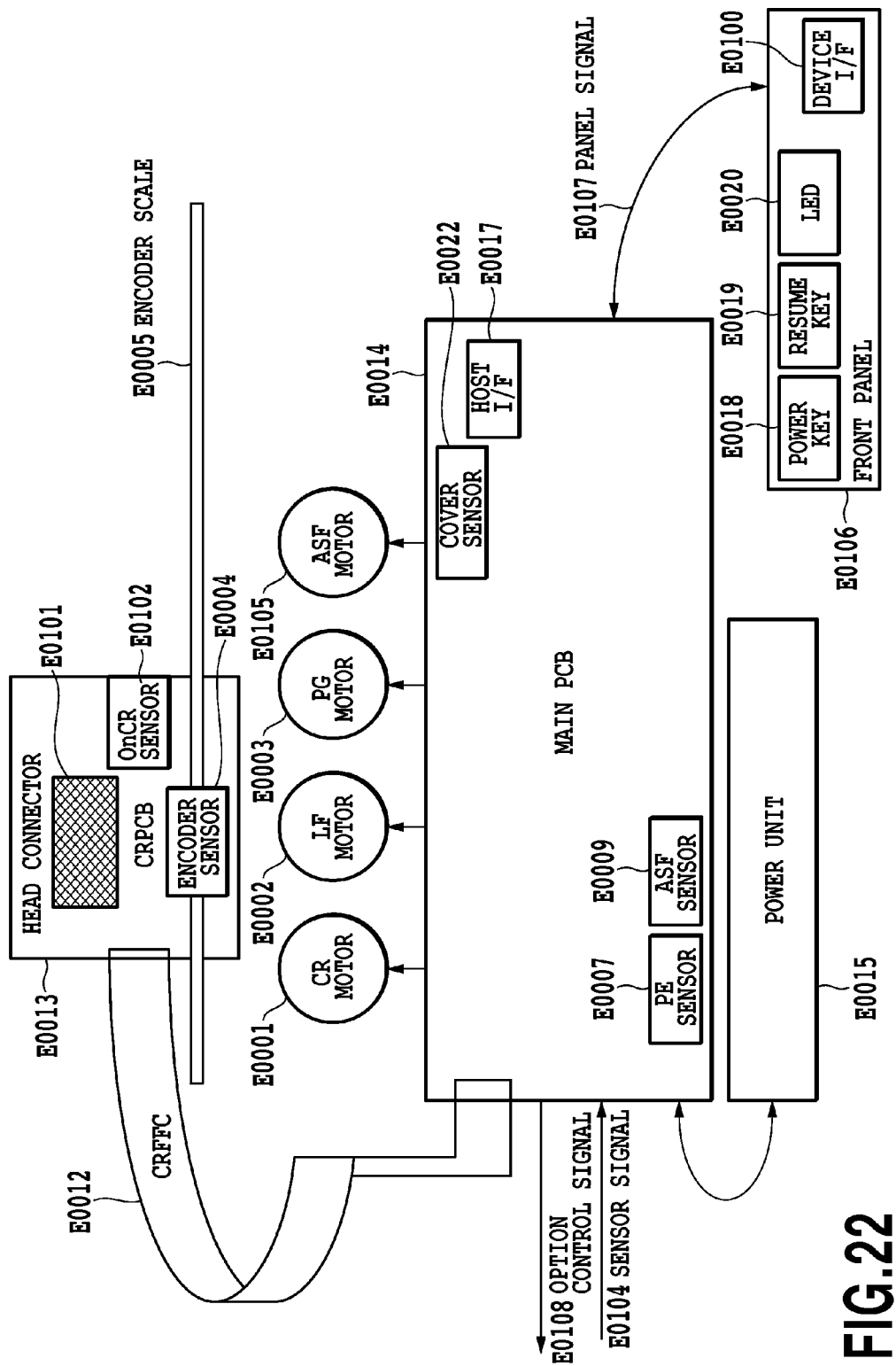
FIG. 22 is a block diagram schematically showing an overall configuration of electric circuits in an embodiment of this invention.

FIG. 22 is a block diagram schematically showing an overall configuration of electric circuitry in this embodiment of the invention.

The printing apparatus of this embodiment comprises mainly the carriage printed circuit board (CRPCB) E0013, the main PCB (Printed Circuit Board) E0014, a power unit E0015 and a front panel E0106.

The power unit E0015 is connected to the main PCB E0014 to supply electricity to various devices.

The carriage PCB E0013 is a printed circuit board unit mounted on the carriage M4000 and functions as an interface to transfer signals to and from the print head H1001 through the head contact E0101. According to a pulse signal output from the encoder sensor E0004 as the carriage M4000 travels, the carriage PCB E0013 also detects a change in the positional relation between the encoder scale E0005 and the encoder sensor E0004. It then sends its output signal through the flexible flat cable (CRFFC) E0012 to the main PCB E0014. The carriage PCB E0013 is provided with a temperature sensor for detecting an ambient temperature, such as a thermistor, and a predetermined optical sensor (these sensors are referred to as an OnCR sensor E0102). Information from the OnCR sensor E0102 is output to the main PCB E0014 through the flexible flat cable (CRFFC) E0012, along with the head temperature information from the head cartridge H1000.

The main PCB E0014 is a printed circuit board unit that controls various devices in the inkjet printing apparatus of this embodiment. Mounted on the main PCB E0014 are a paper end detection sensor (PE sensor) E0007, an automatic sheet feeder (ASP) sensor E0009, a cover sensor E0022 and a host interface (host I/F) E0017. The main PCB E0014 is connected with a carriage motor E0001 for driving the carriage scan, an LF motor 50002 for conveying a print medium, a PG motor E0003 for driving a print head recovery operation, and an ASP motor E0105 for driving a print medium feeding operation. The main PCB E0014 then controls the operations of these functions. Further, the main PCB E0014 receives signals E0104 from sensors representing the mounting and operation state of various option units, such as ink empty sensor, media (paper) sensor, carriage position (height) sensor, LF encoder sensor and PG sensor. To control the operation of these option units, the main PCB E0014 outputs an option control signal E0108. The main PCB E0014 is also connected with the CRFFC E0012, the power unit E0015 and the front panel E0106 and has an interface through which to send and receive information by means of a panel signal E0107.

The front panel E0106 is installed at the front of the printing apparatus body for ease of user operations. The front panel E0106 has a resume key E0019, an LED E0020, a power key E0018 and a device I/F E0100 for connection with peripheral devices such as digital cameras.

FIG. 23 is a block diagram showing an internal configuration of the main PCB E0014.

In the figure, E1102 designates an ASIC (Application Specific Integrated Circuit). The ASIC E1102 is connected through a control bus E1014 to a ROM E1004 and, according to programs stored in the ROM E1004, performs various controls. For example, the ASIC E1102 monitors the state of signals from various sensors on the main PCB E0014 and also the state of sensor signal E0104 and of OnCR sensor signal E1105 from the carriage PCB E0013. The ASIC E1102 also monitors the state of encoder signal E1020 and of outputs from the power key E0018 and resume key E0019 on the front panel E0106. Depending on the connection and data input state of the host I/F E0017 and the device I/F E0100 on the front panel, the ASIC E1102 performs various logic operations and makes decisions on conditions to control a variety of constitutional elements to ensure appropriate overall control and operation of the inkjet printing apparatus. Further, dot array patterns and characteristic mask patterns are also stored in the ROM E1004.

Denoted E1103 is a driver reset circuit supplied by a motor power supply (VM) E1040. The driver reset circuit E1103, according to a motor control signal E1106 from the ASIC E1102, generates a CR motor drive signal E1037, an LP motor drive signal E1035, a PG motor drive signal E1034, and an ASF motor drive signal E1104 and drives the associated motors. Further, the driver reset circuit E1103 has a power supply circuit which supplies electricity to various devices, such as main PCB E0014, carriage PCB E0013 and front panel E0106. It also monitors a drop in power supply voltage and generates and initializes a reset signal E1015.

Denoted E1010 is a power supply control circuit that controls the supply of electricity to various sensors having a light emitting device, in response to a power control signal E1024 from the ASIC E1102. The host I/F E0017 transfers a host I/F signal E1028 from the ASIC E1102 to a host I/F cable E1029 connected to an external circuit and also transfers a signal from the host I/F cable E1029 to the ASIC E1102.

The power unit E0015 supplies a head power (VH) E1039, a motor power (VM) E1040 and a logic power (VDD) E1041. The ASIC E1102 sends a head power ON signal (VHON) E1022 and a motor power ON signal (VMON) E1023 to the power unit E0015 to control the on/off operation of the head power (VH) E1039 and the motor power (VM) E1040. The logic power (VDD) E1041 from the power unit E0015 is voltage-transformed, as required, before being supplied to devices inside and outside the main PCB E0014.

The head power (VH) E1039 is smoothed by the main PCB E0014 before being supplied to the CRFFC E0012 for the operation of the head cartridge H1000.

The ASIC E1102 is a one-chip semiconductor integrated circuit incorporating a logic operation device that produces the aforementioned motor control signal E1106, option control signal E0108, power control signal E1024, head power ON signal E1022 and motor power ON signal E1023. It transfers a signal to and from the host I/F E0017 and also transfers the panel signal E0107 to and from the device I/F E0100. It checks the state of PE detection signal (PES) E1025 from the PE sensor E0007, ASF detection signal (ASFS) E1026 from the ASF sensor E0009 and cover detection signal (COVS) E1042 from the cover sensor E0022. It also checks the state of panel signal E0107, sensor signal E0104 and OnCR sensor signal E1105. According to the result of these checks, the ASIC E1102 controls the panel signal E0107 to turn on or off the LED E0020 on the front panel.

Further, the ASIC E1102 checks the state of encoder signal (ENC) E1020 to generate a timing signal and then interfaces with the head cartridge H1000 to control the print operation with a head control signal E1021. Here the encoder signal (ENC) E1020 is a signal entered from the encoder sensor E0004 through the CRFFC E0012. The head control signal E1021 is fed to the print head H1001 through the flexible flat cable E0012, carriage PCB E0013 and head contact E0101.

Figure 24B:
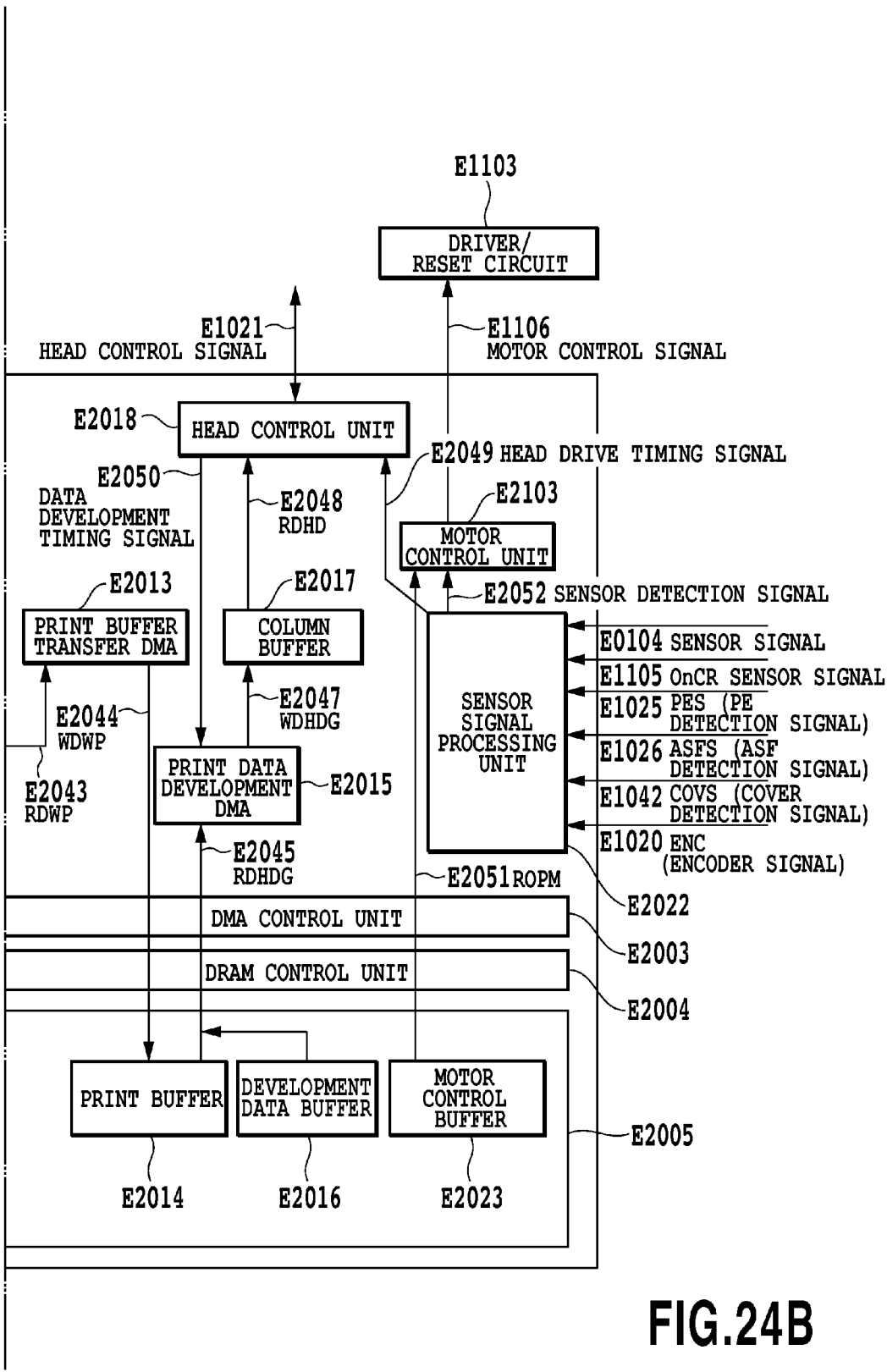
FIG. 24B is a block diagram showing an example internal configuration of an ASIC.

FIG. 24 is a block diagram showing an example internal configuration of the ASIC E1102. As for connections among the blocks in the figure, only flows of data associated with the control of the print head and various mechanical parts, such as print data and motor control data, are shown. Control signals and clocks associated with the reading and writing of registers built into the individual blocks and control signals for the DMA control are omitted to avoid complexities of the drawing.

In the figure, denoted E2107 is a clock control unit that takes in a clock signal (CLK) E2031 from a clock oscillation circuit not shown and transforms its frequency as required to produce a clock (not shown) to be supplied to most parts in the ASIC E1102.

Designated E2102 is a CPU that controls the entire printing apparatus, including print control. The CPU E2102 controls a register read/write operation on the following blocks by using a reset signal E1015, an interrupt signal E2034 output from various blocks in the ASIC and a control signal from the control bus E1014. It also supplies clocks to some blocks and accepts interrupt signals (neither is shown). Further, the CPU E2102 has a built-in RAM and receives a print file from an external device through the device I/F E0100 and converts it into print data.

Denoted E2005 is a DRAM which has, as print data buffers, a receiving buffer E2010, a work buffer E2011, a print buffer E2014 and a development buffer E2016. It also has a motor control buffer E2023 used for motor control.

The DRAM E2005 is also used as a work area by the CPU E2102 for its operation. That is, a DRAM control unit E2004 switches between an access to the DRAM E2005 from the CPU E2102 via control bus and an access to the DRAM E2005 from a DMA control unit E2003 described later, in order to perform a read/write operation on the DRAM E2005.

The DMA control unit E2003 accepts request signals (not shown) from various blocks. Then, for a write operation, it outputs read data E2038, E2041, E2042, E2044 along with an address signal and a control signal (not shown) to the DRAM control unit to make an access to the DRAM. For a read operation, the DMA control unit E2003 transfers data E2040, E2043, E2045, E2051 read from the DRAM control unit E2004 back to the requesting blocks.

Denoted E2007 is a universal serial bus (USB) device that, under the control of CPU E2102, functions as a bidirectional communication interface with an external host device not shown through the host I/F E0017. Further, in the print operation, the USB device E2007 transfers, by the DMA operation, data received from the host I/F E0017 (host originating data E2037) to a reception control unit E2008.

Denoted E2101 is a USB host E2101 which, under the control of CPU E2102, works as a bidirectional communication interface with an external device not shown, via the device I/F E0100. Further, in the print operation, the USB host E2101 transfers, by the DMA operation, data received from the device I/F E0100 (device originating data E2108) to the reception control unit E2008. The reception control unit E2008 writes received data (WDIF) E2038 from the selected I/F of the USB device E2007 or the USB host E2101 into a receiving buffer write address managed by a receiving buffer control unit E2039.

Denoted E2009 is a compression/extension DMA controller which, under the control of CPU E2102, reads received data (raster data) stored on the receiving buffer E2010 from a receiving buffer read address managed by the receiving buffer control unit E2039. The compression/extension DMA controller E2009 performs a compression/extension on the read-out data (RDWK) E2040 in a specified mode. The print codes thus obtained are rearranged and put in addresses on the work buffer E2011 that match the order in which the print codes are transferred to the head cartridge H1000. The print codes are then written as a print code string WDWK E2041 into the work buffer area.

Denoted E2013 is a print buffer transfer DMA controller which, under the control of CPU E2102, reads print codes (RDWP) E2043 on the work buffer E2011 and transfers them to the print buffer E2014 (WDWP E2044).

Denoted E2012 is a work area DMA controller, which under the control of CPU E2102, writes specified work file data (WDWF) E2042 repetitively into the work buffer, from which the data transfer by the print buffer transfer DMA controller E2013 has been completed.

Denoted E2015 is a print data development DMA controller which, under the control of CPU E2102, reads the print code written into the print buffer and development data (developed print data RDHDG E2045) written into the development buffer E2016. This is triggered by a data development timing signal E2050 from a head control unit E2018. The print data development DMA controller E2015 then writes the read-out data as column buffer write data (WDHDG) E2047 into a column buffer E2017. The column buffer E2017 is an SRAM to temporarily store the data destined for the head cartridge H1000 (developed print data). The column buffer E2017 is shared and managed by the print data development DMA controller E2015 and the head control unit E2018 through a handshake signal (not shown).

Denoted E2018 is a head control unit which, under the control of CPU E2102, interfaces with the head cartridge H1000 through the head control signal. Based on a head drive timing signal E20419 from a sensor signal processing unit E2022, the head control unit E2018 outputs the data development timing signal E2050 to the print data development DMA controller E2015. During the print operation, the head control unit E2018, in response to the head drive timing signal E2049, reads developed print data (RDHD) E2048 from the column buffer and outputs that data as the head control signal E1021 to the head cartridge H1000.

Denoted E2022 is a sensor signal processing unit which receives the sensor signal E0104, OnCR sensor signal E1105, PE detection signal E1025, ASF detection signal E1026 and cover detection signal E1042. Then, the sensor signal processing unit E2022 sends this sensor information to the CPU E2102 in a mode determined by the control of CPU E2102. It also outputs a sensor detection signal E2052 to a motor control unit E2103. Upon receiving the encoder signal (ENC), the sensor signal processing unit E2022 outputs the head drive timing signal E2049 in a mode determined by the control of CPU E2102. Further, it stores in a register the information representing the position and speed of a carriage M4001 obtained from the encoder signal E1020 and supplies it to the CPU E2102. Based on the information, the CPU E2102 determines a variety of parameters used in the control of the carriage motor E0001. Similarly, upon receiving an LF encoder sensor signal making up the sensor signal E0104, the sensor signal processing unit E2022 stores the information on the paper feed position and speed in the register and provides it to the CPU E2102. The CPU E2102, based on this information, determines various parameters used in the control of the LF motor E0002.

Denoted E2104 is an A/D converter which converts into digital values those analog signals, such as a media discrimination sensor output and an ink empty sensor output, both making up the sensor signal E0104, and an ambient temperature detection thermistor output making up the OnCR sensor signal E1105. It also converts such analog signals as a reflective sensor output and a head temperature detection output into digital values. It then transfers these sensor detection information to the CPU E2102 in a mode determined by the control of the CPU E2102.

The motor control unit E2103, under the control of CPU E2102, reads a motor drive table (RDPM) E2051 from the motor control buffer E2023 on the DRAM E2005, as situation demands, and produces the motor control signal E1106. Depending on the operation mode, the motor control unit E2103 uses various sensor detection signals as a control trigger for outputting the motor control signal E1106.

Denoted E2105 is a panel I/F unit which, under the control of CPU E2102, produces a LED control signal making up the panel signal E0107. Upon reception of the status outputs of the power key and resume key making up the panel signal, the panel I/F P2105 transfers them to the CPU E2102.

Designated E2029 is a port control unit which, under the control of CPU E2102, produces the head power ON signal E1022, motor power. ON signal E1023 and power control signal E1024.

(Print Head Construction)

The construction of the head cartridge H1000 applied to this embodiment will be explained. The head cartridge H1000 of this embodiment has a print head H1001, a means to mount an ink tank H1900, and a means to supply ink from the ink tank H1900 to the print head. It is removably mounted on the carriage M4000.

Figure 25:
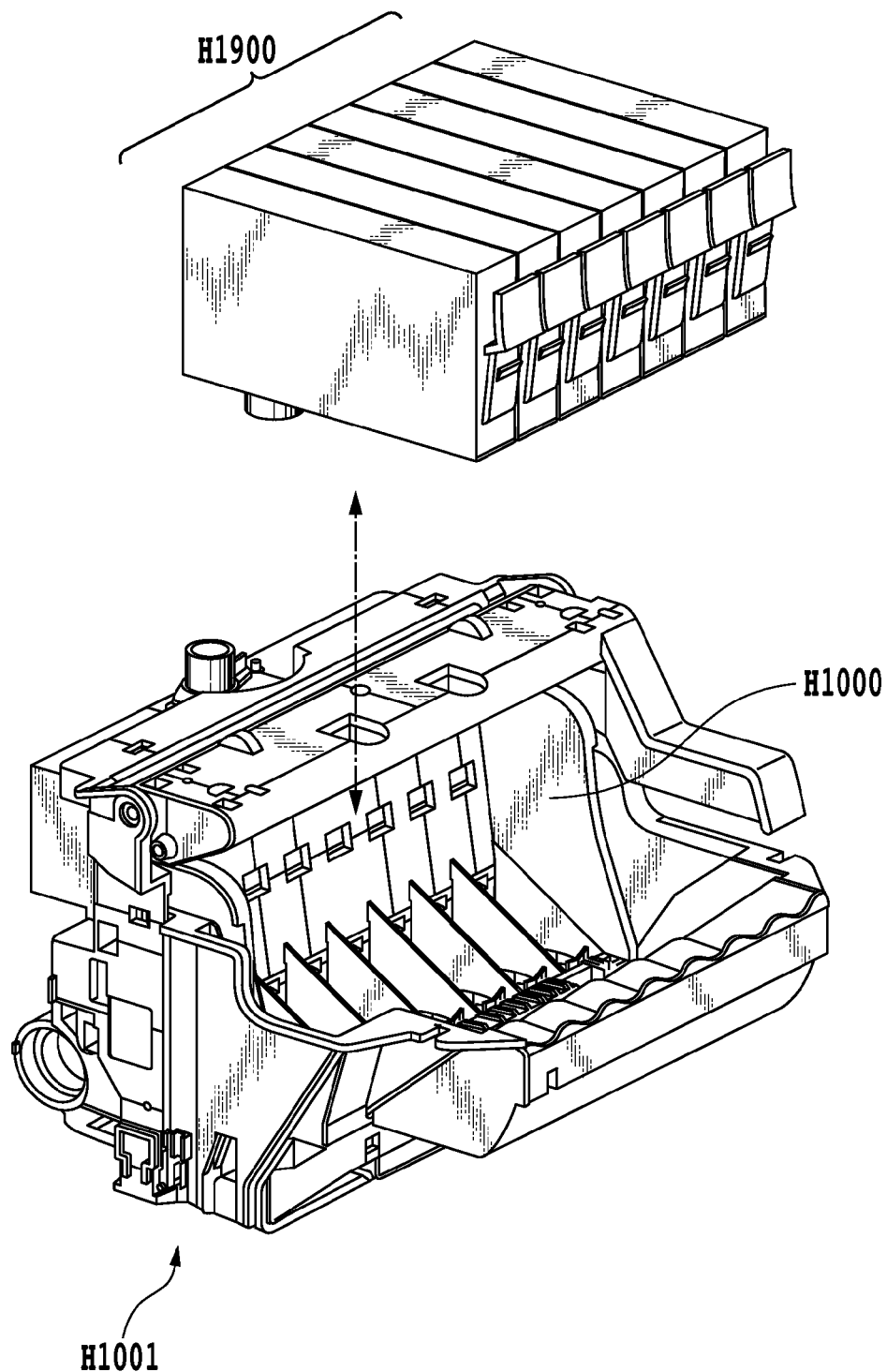
FIG. 25 is a perspective view showing ink tanks being installed in a head cartridge applied to an embodiment of this invention.

FIG. 25 shows how the ink tank H1900 is mounted on the head cartridge H1000 of this embodiment. The printing apparatus of this invention forms an image using seven colors of ink—cyan, magenta, yellow, black, red, green and blue—and seven ink tanks H1900 are provided for respective colors. As shown in the figure, these ink tanks are individually removably mounted on the head cartridge H1000. The mounting and dismounting of the individual ink tanks H1900 can be done with the head cartridge H1000 placed in the carriage M4000.

Figure 26:
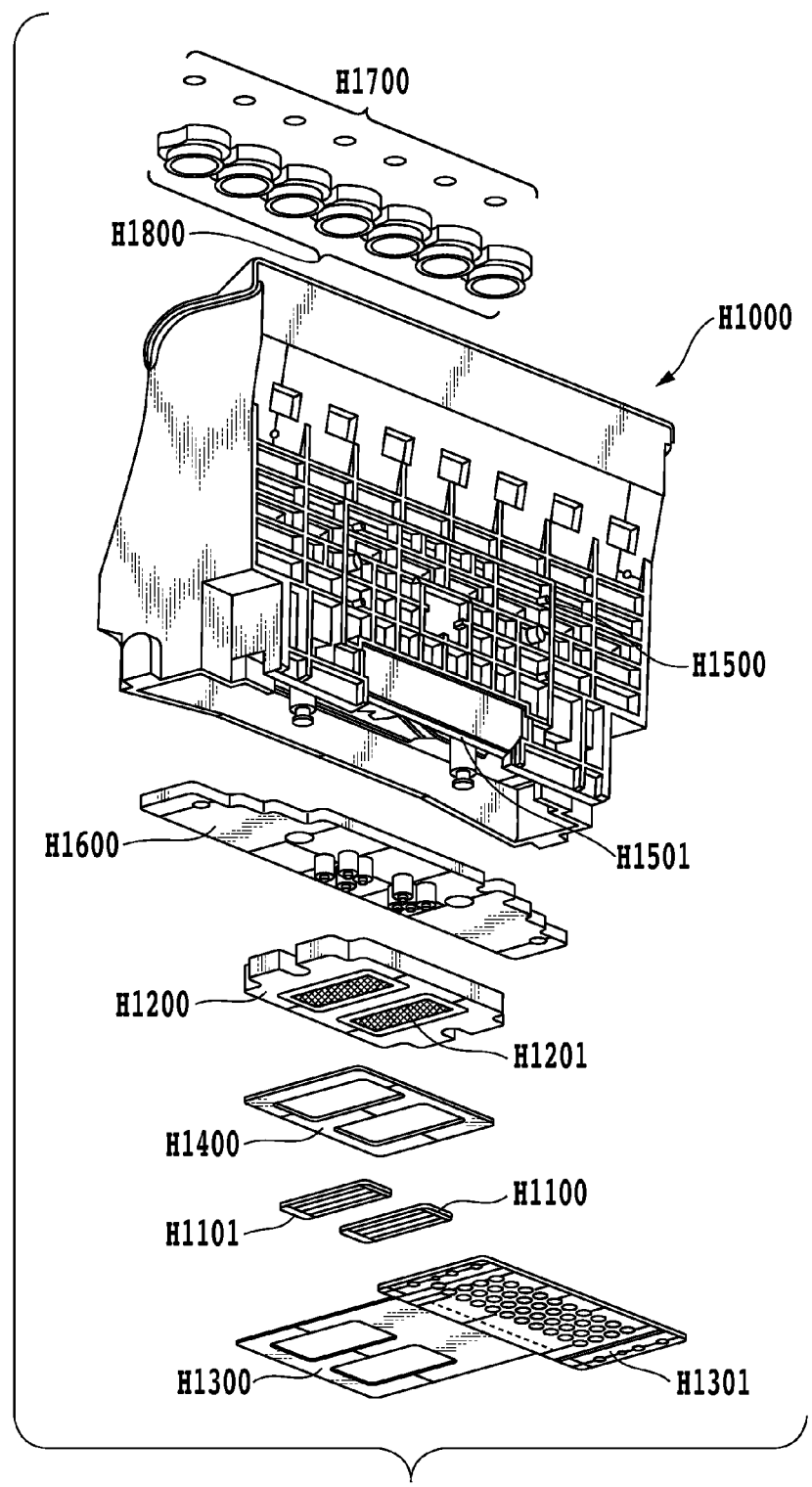
FIG. 26 is an exploded perspective view of a head cartridge.

FIG. 26 is an exploded perspective view of the head cartridge H1000. In the figure, the head cartridge H1000 has a first nozzle board H1100 and a second nozzle board H1101, and a first plate H1200 and a second plate H1400. It also has an electric wiring board H1300, a tank holder H1500, a flow path forming member H1600, a filter H1700 and a seal rubber H1800.

The first nozzle board H1100 and the second nozzle board H1101 are silicon boards with a plurality of nozzles for ink ejection formed on one side thereof by photolithography. Electric wiring, such as Al for supplying electricity to individual nozzles, are formed by a deposition technique and a plurality of ink paths corresponding to the individual nozzles are also formed by the photolithography. Further, an ink supply port to supply ink to the plurality of ink paths is formed in the print head to open to its back.

Figure 27:
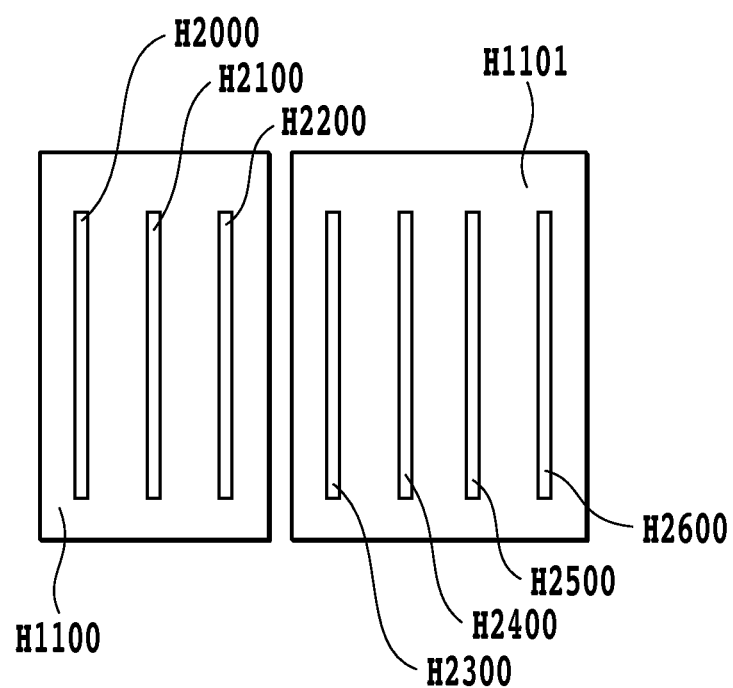
FIG. 27 is an enlarged front view showing the construction of a first nozzle board and a second nozzle board.

FIG. 27 is an enlarged front view showing the construction of the first nozzle board H1100 and the second nozzle board H1101. Designated H2000 to H2600 are arrays of nozzles (or nozzle arrays) corresponding to different ink colors. The first nozzle board H1100 is formed with nozzle arrays for three colors—a nozzle array H2000 for cyan ink, a nozzle array H2100 for magenta ink and a nozzle array H2200 for yellow ink. The second nozzle board H1101 is formed with nozzle arrays for four colors—a nozzle array H2300 for black ink, a nozzle array H2400 for red ink, a nozzle array H2500 for green ink and a nozzle array H2600 for blue ink.

Each nozzle array has 768 nozzles lined in the print medium conveying direction at an interval of 1200 dpi (dots/inch), each with an ejection capacity of about 2 picoliters of ink. The area of each nozzle opening is set at about 100 $\mu m^2$. The first nozzle board H1100 and the second nozzle board H1101 are securely bonded to the first plate H1200. The first plate H1200 is formed with an ink supply port H1201 to supply ink to the first nozzle board H1100 and the second nozzle board H1101.

Further, the first plate H1200 is securely bonded with the second plate H1400 that has openings. The second plate H1400 holds an electric wiring board H1300 that makes electrical connections with the first nozzle board H1100 and the second nozzle board H1101.

The electric wiring board H1300 applies electric signals to the first nozzle board H1100 and the second nozzle board H1101 to cause individual nozzles formed in these boards to eject ink. The electric wiring board H1300 has electric wires for the first nozzle board H1100 and the second nozzle board H1101. It also has an external signal input terminal H1301 situated at the end of the electric wires to receive electric signals from the printing apparatus body. The external signal input terminal H1301 is positioned at and secured to the back of the tank holder H1500.

The tank holder H1500 for holding the ink tank H1900 has the flow path forming member H1600 secured thereto by ultrasonic welding, for example, to form an ink path H1501 leading from the ink tank H1900 to the first plate H1200.

The ink path H1501 adapted to engage the ink tank H1900 has a filter H1700 attached to its end on the ink tank side so that ingress of external dirt can be prevented. It also has a seal rubber H1800 installed at its engagement portion with the ink tank H1900 to prevent evaporation of ink from the engagement portion.

Further, the tank holder unit and the print head H1001 are bonded together to form the head cartridge H1000. The tank holder unit, as described above, comprises the tank holder H1500, flow path forming member H1600, filter H1700 and seal rubber H1800. The head cartridge H1000 comprises the first and second nozzle board H1100, H1101, first plate H1200, electric wiring board H1300 and second plate H1400.

Figure 28:
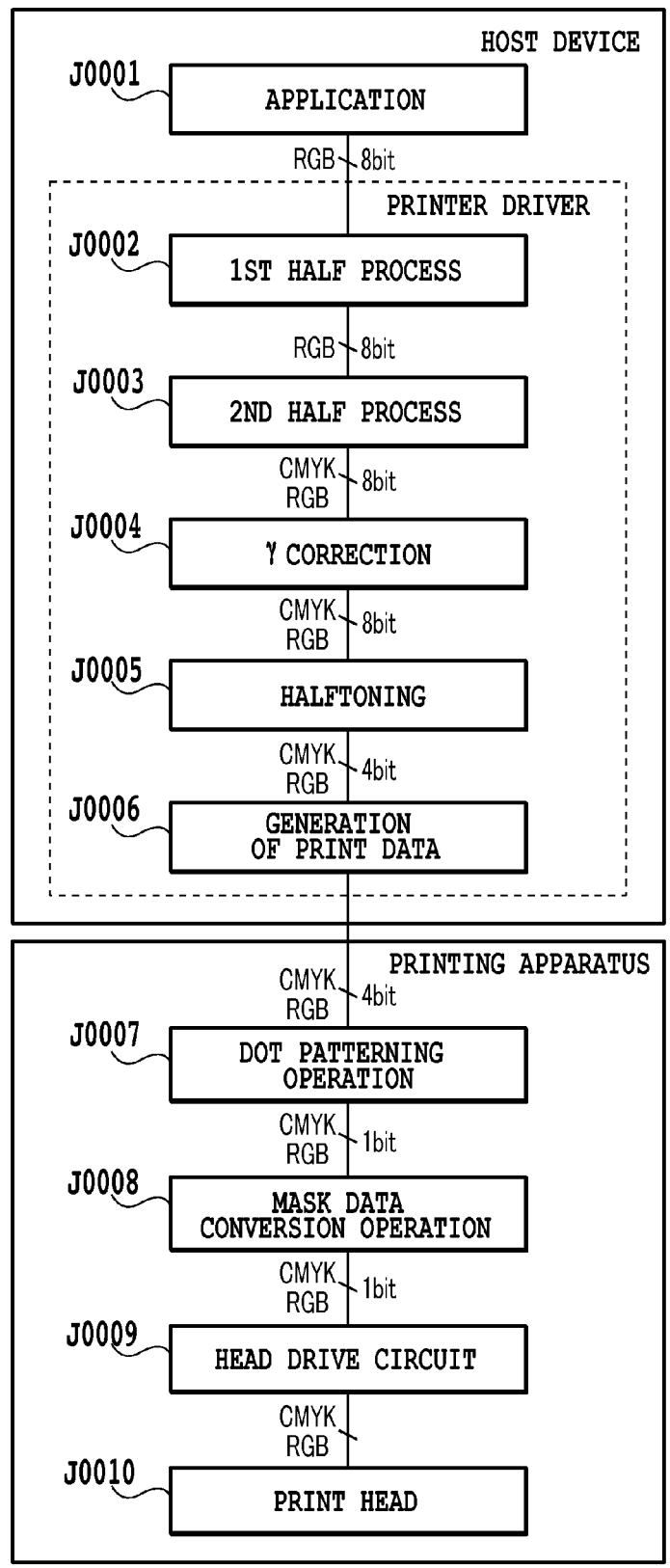
FIG. 28 is a block diagram showing a flow of an image data conversion operation in an embodiment of this invention.

FIG. 28 is a block diagram showing a flow of an image data conversion operation in this embodiment. The inkjet printing apparatus of this embodiment performs a printing operation using red, green and blue inks in addition to the basic ink colors of cyan, magenta, yellow and black. So, it has seven print heads for these seven colors of ink. The operations shown in FIG. 28 are executed by the printing apparatus and a host device in the form of a personal computer (PC).

Programs running on an operating system in the host device include an application and a printer driver. The application J0001 executes an operation of producing image data to be printed by the printing apparatus. In an actual printing operation, the image data prepared by the application is handed over to the printer driver.

The printer driver in this embodiment performs a first-half process J0002, a second-half process J0003, a γ correction process J0004, a half-toning process J0005 and a print data generation process J0006. To briefly explain these processes, the first-half process J0002 performs a mapping of a color space (gamut), followed by a data conversion that moves a gamut represented by image data R, G, B of the sRGB standard into a gamut that is reproduced by the printing apparatus. More specifically, data representing each of F, G, B in 8 bits is transformed into 8-bit data for F, G, B with different contents, by using a three-dimensional LUT.

The second-half process J0003 performs an operation which determines color separation data Y, M, C, K, R, G and B that corresponds to a combination of inks used to reproduce a color represented by the gamut-mapped data R, G, B. In this embodiment, this second-half process J0003 is assumed to be performed in combination with an interpolation operation using a three-dimensional LUT, as in the first-half process.

The γ correction process J0004 performs a grayscale level conversion for each color of the color separation data determined by the second-half process J0003. More specifically, the conversion linearly matches the color separation data to the grayscale characteristics of the printing apparatus by using a one-dimensional LUT that corresponds to the grayscale characteristic of each color ink of the printing apparatus.

The half-toning process J0005 performs a quantization that converts each piece of the 8-bit color separation data Y, M, C, K, R, G and B into 4-bit data. In this embodiment, an error diffusion method is used for the conversion of 256-grayscale-level 8-bit data to 6-grayscale-level 4-bit data. The 4-bit data constitutes an index pointing to an arrangement pattern in the dot arrangement patterning operation by the printing apparatus.

The last operation done by the printer driver is the print data generation process J0006 that generates print data by adding print control information to print image data containing the 4-bit index data.

Then the printing apparatus performs a dot arrangement patterning process J0007 and a mask data conversion process J0008 on the print data supplied.

The dot arrangement patterning process J0007 in this embodiment will be explained as follows. The half-toning process has lowered the number of levels from 256 level multi-value grayscale level information (8-bit data) to 6 level grayscale level information (4-bit data). However, the information the inkjet printing apparatus of this embodiment can print is binary information indicating whether or not to eject ink. The dot arrangement patterning process has a function of reducing the number of levels from 6 levels (level 0 to level 5) to two levels (level 0 and level 1). More specifically, 4-bit 6-level (level 0-level 5) 600-dpi pixel data is transformed into 1200-dpi binary image data which is represented by either 1 or 0.

In this embodiment, each pixel represented by 4-bit data is allotted a dot arrangement pattern corresponding to the grayscale level of the pixel in order to define, for each of 2×2 subpixels making up one pixel, ejection data (binary data) of "1" or "0" that specifies whether or not each of the subpixels in one pixel is to be printed with a dot of the same color. In this specification pixel refers to the minimum area whose grayscale level can be expressed with n dots (n is an integer greater than 0). A subpixel is an area obtained by dividing the above-mentioned pixel and which is defined either to be printed or not to be printed with a dot.

Figure 9:
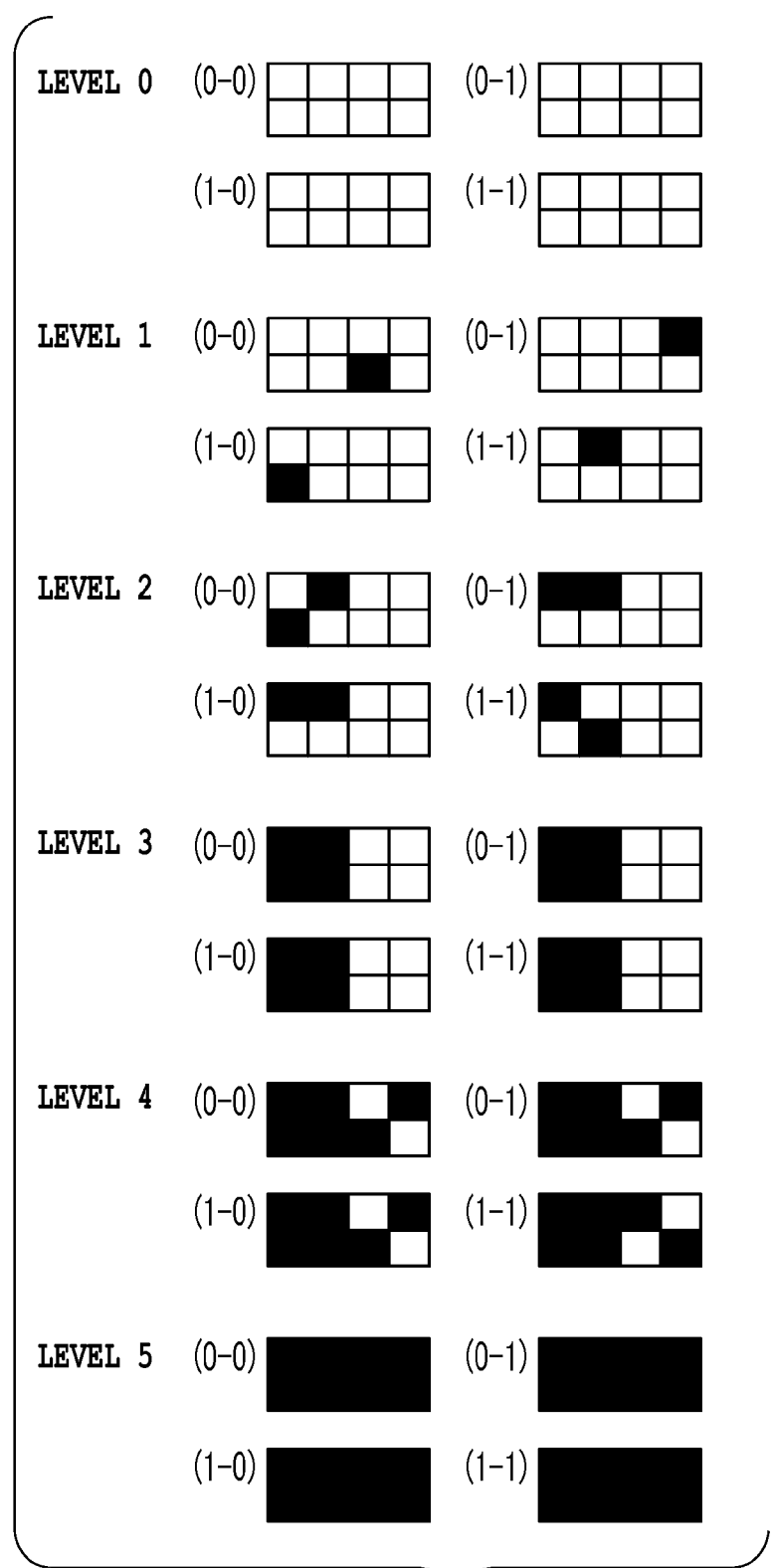
FIG. 9 is a schematic diagram showing dot arrangement patterns in an embodiment of this invention.

FIG. 9 is a schematic diagram showing dot arrangement patterns referenced by the dot arrangement patterning process of this embodiment. On the left side in the figure six different level values (0-5) entered from the host device are shown; and to the right of each of the levels are shown four dot arrangement patterns allotted to that level. All these dot arrangement patterns, as data, are shown to have a 4 (column)×2 (raster)-subpixel structure to define whether or not to print a dot in each of the 2×2 subpixels making up a pixel on a print medium, with a black subpixel (1) indicating that a dot is to be printed on a corresponding subpixel on a print medium and a white subpixel (0) indicating no dot is to be printed there. It is seen that the number of black subpixels (1) specifying the printing of a dot steadily increases as the level value increases.

The four dot arrangement patterns allotted to each of the levels are used in the main scan direction and subscan direction alternately so that even if the same level values are specified in succession, dot printing is not biased towards one pattern. These dot arrangement patterns are stored in advance in the ROM E1004 of the printing apparatus.

In this embodiment the converted binary image data is divided into four groups that are printed on a print medium in four print scans. To perform such an image data division, the binary image data output from the dot arrangement patterning process is subjected to the mask data conversion process J0008.

The mask data conversion process J0008 of this embodiment classes the binary image data output from the dot arrangement patterning process J0007 into odd-numbered column data and even-numbered column data and takes a logical AND between individual column data and a mask pattern prepared in advance. Then, print scans, that print a dot only on those subpixels that are required by the image data to be printed (1) and which are permitted by the mask pattern to be printed (1), are performed for the odd-numbered column data and the even-numbered column data alternately. With this printing operation, the binary image data output from the dot arrangement patterning process J0007 is expressed on a print medium.

Figure 6:
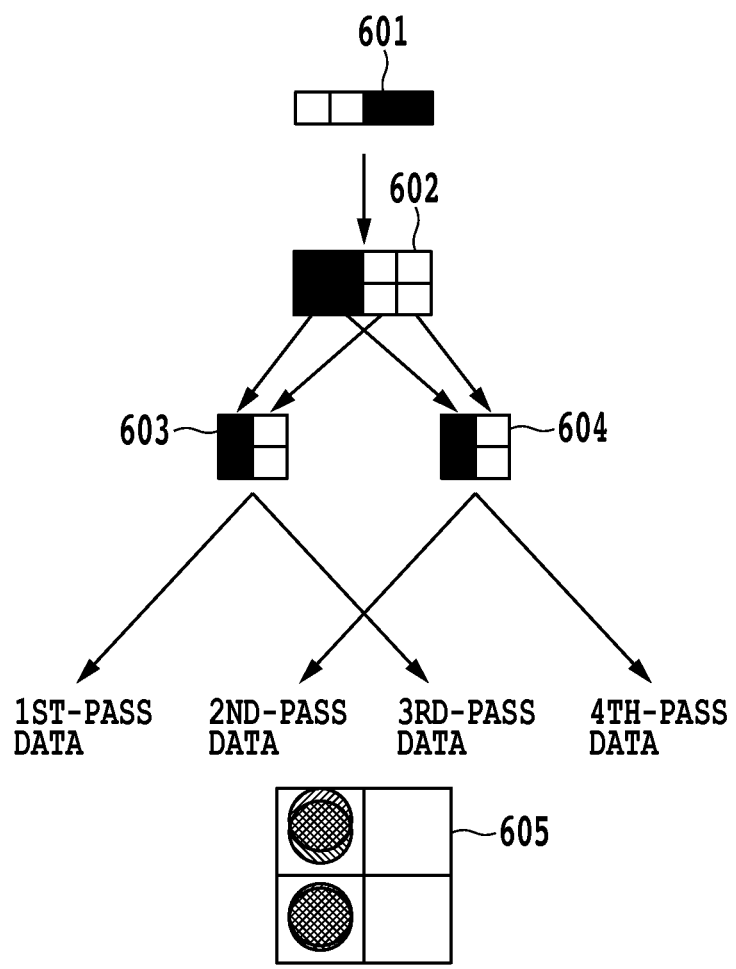
FIG. 6 is a schematic diagram showing how odd-numbered column data and even-numbered column data are handled.

FIG. 6 schematically shows how the odd-numbered column data and the even-numbered column data are handled. Here is shown a case where level-3 4-bit data 601 is entered into the dot arrangement patterning process J0007. The level-3 4-bit data 601 is converted into a dot arrangement pattern 602 having a 4 (column)-by-2 (raster)-subpixel pattern by referencing the dot arrangement patterns of FIG. 9 (see FIG. 9).

The dot arrangement pattern 602 is divided into odd-numbered column data 603 made up of odd-numbered columns (first column and third column) and even-numbered column data 604 made up of even-numbered columns (second column and fourth column). The odd-numbered column data 603 is then logically ANDed with two mask patterns that are complementary to each other. The masked odd-numbered column data 603 then is apportioned into image data corresponding to two print scans. On the other hand, the even-numbered column data 604 is also logically ANDed with two mask patterns that are complementary to each other, before being apportioned into image data corresponding to two print scans. The aforementioned apportionment of odd-numbered column data and even-numbered column data into respective print scans can be realized by using the mask patterns described below.

Figure 10:
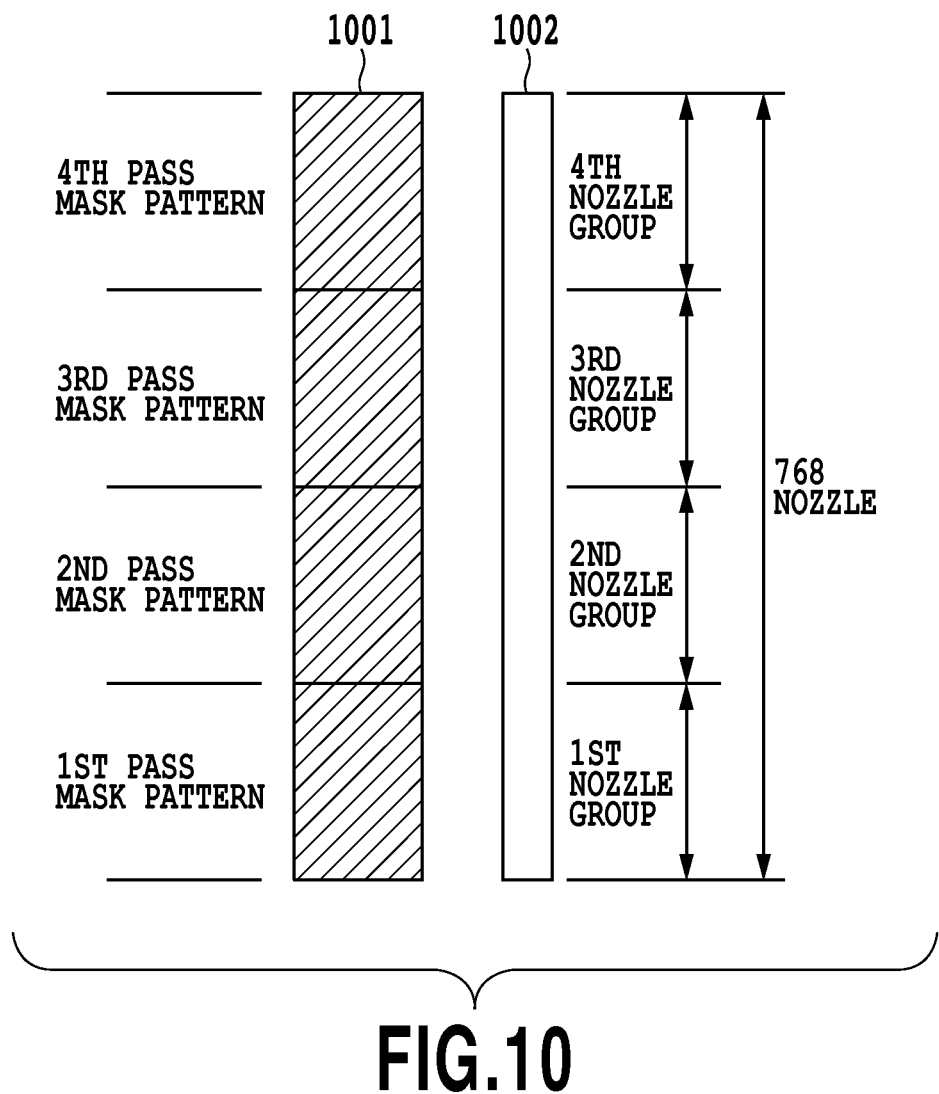
FIG. 10 is a diagram showing a relation between a black nozzle array and a corresponding mask pattern in an embodiment of this invention.

FIG. 10 is a figure for explaining the relationship between a one color nozzle array 1002 and a mask pattern 1001 of this embodiment, which corresponding to the nozzle array 1002. The mask pattern 1001 has a width (a number of subpixels) in the subscan direction that matches the 768 nozzles and a length in the main scan direction of 128 subpixels, with each subpixel defined in advance either as print-permitted (1) or non-print-permitted (0). The mask pattern may be shared by a plurality of nozzle arrays in the print head. It is also possible to provide a plurality of such mask patterns so that they can be allotted to individual nozzle arrays.

In the 4-pass printing of this embodiment, the 768 nozzles can be divided into four nozzle groups (first to fourth nozzle group) of 192 nozzles. After every print scan, a print medium is conveyed a distance corresponding to one nozzle group (192 nozzles) in the subscan direction. An area on the print medium corresponding to the width of each of the nozzle groups (192 nozzles each) is hereinafter called a unit area. Each of the unit areas is printed with dots in a total of four print scans from a first-pass print scan using the first nozzle group to a fourth-pass print scan using the fourth nozzle group.

The individual nozzle groups are each allotted a dedicated mask pattern. In the following explanation, a mask pattern allotted to the first nozzle group and used for the first print scan (first pass) on a unit area is referred to as a first-pass mask pattern. Similarly, a second-pass mask pattern used for the second print scan (second pass), a third-pass mask pattern used for the third print scan (third pass), and a fourth-pass mask pattern used for the fourth print scan (fourth pass) are arranged as shown. Here, the first-pass mask pattern and the third-pass mask pattern are complementary to each other; and the second-pass mask pattern and the fourth-pass mask pattern are also complementary to each other. Using these mask patterns, by alternately performing print scans for the odd-numbered column data and print scans for the even-numbered column data, image data that is to be printed by the dot arrangement patterning process is printed with dots in one of the four passes. For example, unit areas that are printed with the odd-numbered column data in the first and third pass are printed with the even-numbered column data in the second and fourth pass. Unit areas that are printed with the even-numbered column data in the first and third pass are printed with the odd-numbered column data in the second and fourth pass. The dot arrangement patterning process, and the decode process that classifies the dot arrangement patterned binary data into odd-numbered column data and even-numbered column data, are disclosed in Japanese Patent Laid-Open No. H10-081025 (1998). Further, the method of printing images by using different print scans to print odd-numbered column data and even-numbered column data, and the data processing are also disclosed in Japanese Patent Laid-Open Nos. 2002-29097 and 110-081025(1998).

When binary data to be printed in print scans are determined by the mask data conversion process, it is sent to the head driving circuit J0009. The print head H1001, according to the drive signal input from the head driving circuit J0009, ejects ink to print dots on a print medium.

In this embodiment, the odd-numbered column data and the even-numbered column data of the dot arrangement pattern are printed in different print scans in such a way that dots corresponding to these column data overlap each other on the print medium. More specifically, the printing operation is performed such that data for the first column and the second column overlap each other and that data for the third column and the fourth column overlap each other.

While in this embodiment, too, as in Japanese Patent Laid-Open No. 2002-29097, print scans for odd-numbered column data and print scans for even-numbered column data are alternated, this embodiment is characterized in that the odd-numbered column data and the even-numbered column data are made to overlap each other on the print medium. For example, in the case of FIG. 6, the odd-numbered column data 603 and the even-numbered column data 604 are printed at the same position. On the print medium, as shown at 605, two upper and lower subpixels on the left side are formed with two overlapping dots each.

Although a level 3 case has been explained in the example using FIG. 6, similar dot printing by the same method is also performed for other levels. Referring again to FIG. 9, the dot overlapping state for each level will be explained. First, level 1 represents a state in which all dots are formed separate without overlapping each other. In the following explanation, those dots that are formed separate on a print medium without any overlap with other dots are referred to as single dots. On the other hand those dots that are printed overlappingly on a print medium are called overlapping dots.

At level 2, two of the four dot arrangement patterns are used to form overlapping dots, and the remaining two dot arrangement patterns are used to form only single dots. That is, this is a state where about 50% of the printed dots are single dots and the remaining 50% overlapping dots. At level 3, as explained with reference to FIG. 6, all printed dots are overlapping dots. Further, at level 4, single dots and overlapping dots account for about 50% each. At level 5, all subpixels are printed with overlapping dots.

Generally, even if the same numbers of dots are formed, the use of overlapping dots results in a lower coverage ratio on a print medium than when single dots are printed. This means that a density expressed in a particular area of print medium becomes lower when the percentage in that area of overlapping dots is larger than that of single dots. In this embodiment, the expressed density is made to match an input level by appropriately adjusting the ratio of overlapping dots to single dots at each level and among a plurality of levels.

It is also noted that the magnitude of change in density caused by a print position misalignment greatly varies between single dots and overlapping dots.

Figure 1A:
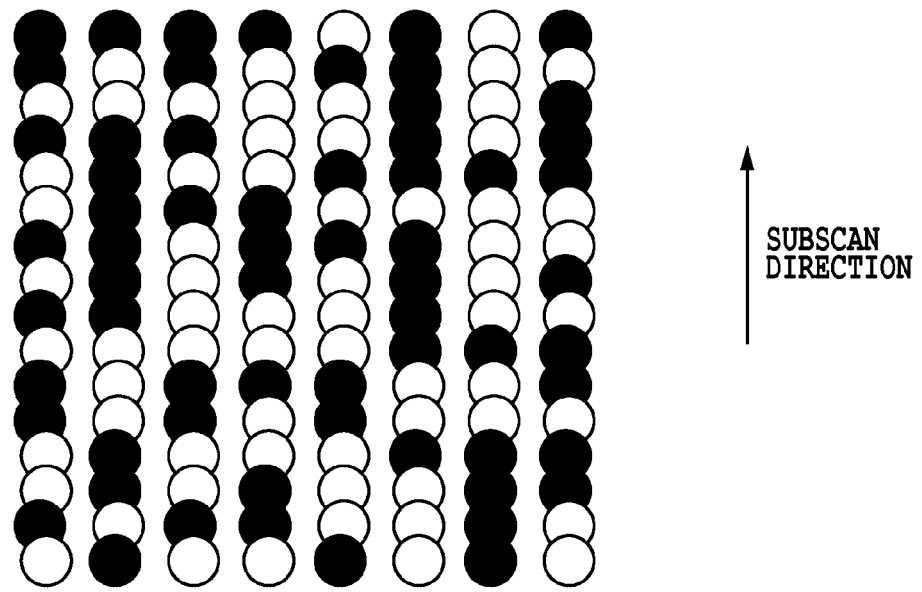
FIG. 1A and FIG. 1B are schematic diagrams showing an effect print position misalignments have on a density of an image being printed when all dots are single dots.
Figure 1B:
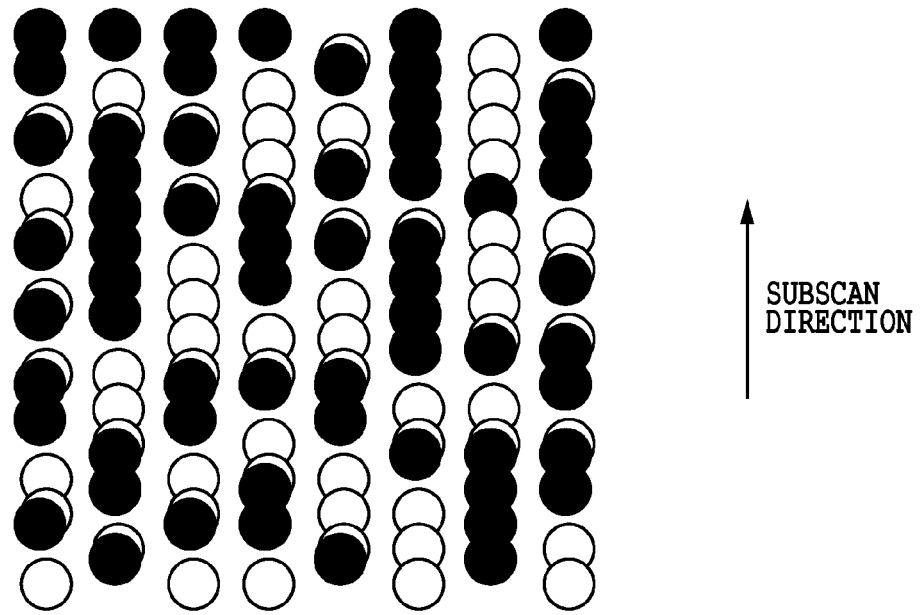

FIGS. 1A and 1B show effects that print position misalignments have on density when all dots are single dots. Dots shown in black are of a first dot group printed in the first print scan; and white dots are of a second dot group printed in the second print scan, which follows the first print scan. If there are no print position misalignments between two print scans, dots are arrayed as shown in FIG. 1A, with the first group dots and the second group dots formed as single dots and complementing each other in the subscan direction. However, if print position misalignments occur in the subscan direction between the two print scans, the second dot group shifts in the subscan direction with respect to the first dot group, resulting in the complementary dot relationship being lost. As a result, the single dots decrease in number while the overlapping dots increase, leaving some areas on a print medium not covered with dots in the subscan direction as shown in FIG. 1B. This causes the density to decrease when compared with FIG. 1 in which no print position misalignments occur.

Figure 2A:
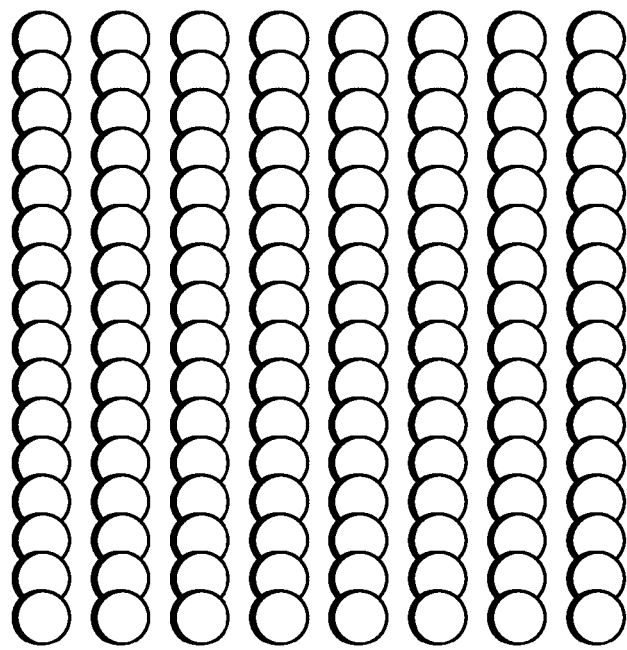
FIG. 2A and FIG. 2B are schematic diagrams showing an effect print position misalignments have on a density of a printed image when all dots are overlapping dots.
Figure 2B:
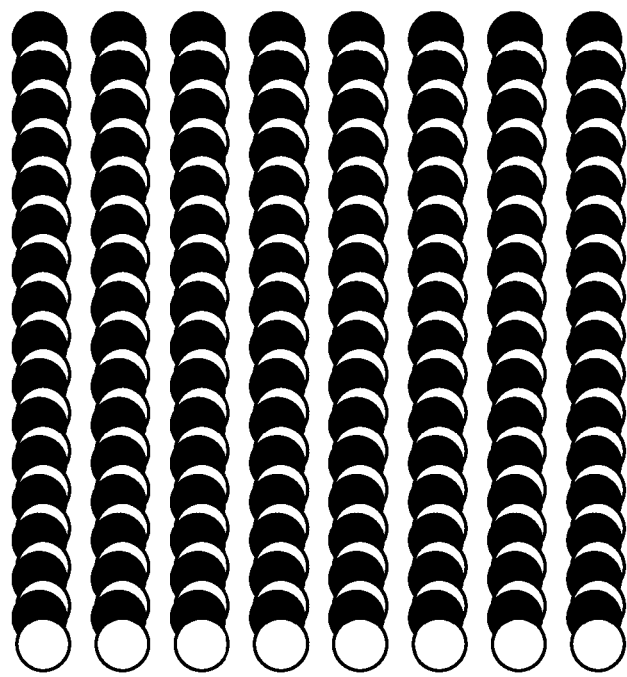
Figure 3:
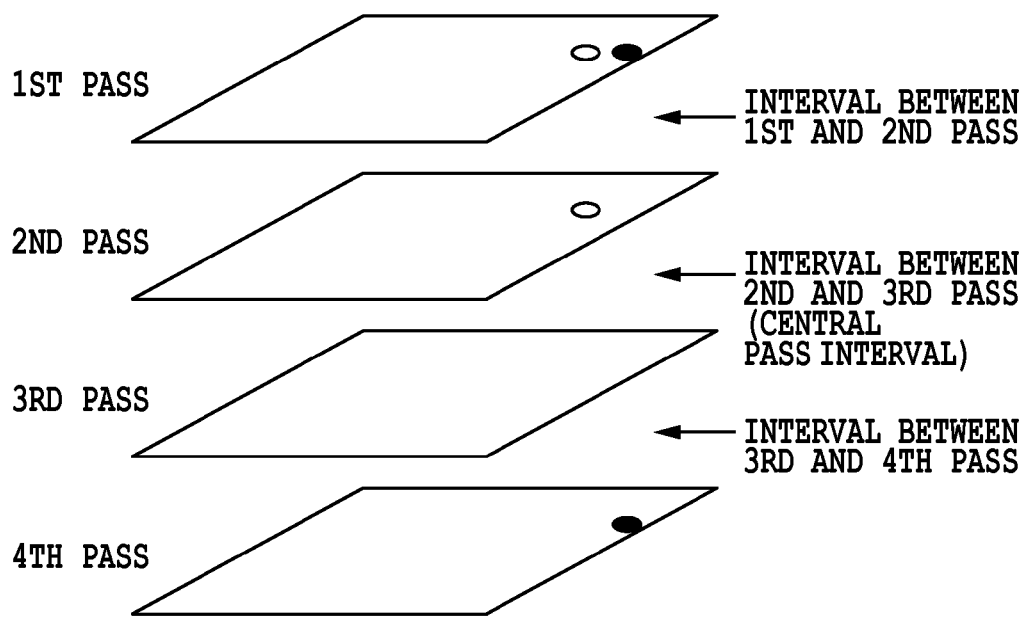
FIG. 3 is a schematic diagram showing conceptually the state of a print position misalignment when a 4-pass printing is performed.

On the other hand, FIGS. 2A and 2B show effects that print position misalignments have on the density when all dots are overlapping dots. White dots printed in the second print scan are shown overlapping all of the first dot group (black dots). In this case, if the first dot group and the second dot group shift from each other, what happens here is that combinations of two overlapping dots simply shift in the subscan direction and the number of overlapping dots or single dots does not increase or decrease. That is, the density does not change from that of FIG. 2 in which no print position misalignments occur.

As described above, density changes due to print position misalignments are directly caused by a change in the coverage ratio on the print medium that occurs when a print position misalignment occurs. And the coverage ratio is influenced by the numbers of single dots and overlapping dots in the unit area and by their ratio.

Where the dot arrangement patterns shown in FIG. 9 are used, the printed state at level 3 and level 5, for instance, will be as shown in FIGS. 2A and 2B, in which if a print position misalignment occurs in the subscan direction, the density remains unchanged. In the case of level 1, although dots are all single dots, they are printed sufficiently separated from each other so that a print position misalignment of a magnitude of approximately one subpixel is highly unlikely to cause the single dots to change into overlapping dots. So, a density reduction is considered unlikely to happen.

On the other hand, at levels where even a slight shift of some dots causes changes in the overlapping and separation relationship between these dots and their neighboring dots, for example at level 2 and level 4, any print position misalignment is likely to cause density changes. At these levels, if all dots are single dots, print position misalignment, should it occur, lowers the coverage ratio and decreases the density. On the other hand, if all dots are overlapping dots, print position misalignment separates all overlapping dots from each other into single dots, raising the coverage ratio and increasing the density. If overlapping dots and single dots are intermingled as shown in FIG. 9, there occurs not only locations where the print position misalignment causes two single dots to overlap each other but also locations where it causes overlapping dots to part from each other. That is, even if a print position misalignment occurs, large density variations will not result as long as the coverage ratio does not change significantly from that when no print position misalignment occurs.

With these circumstances considered, the inventors of this invention have found that, in preventing a possible change in density in the event of an unexpected print position misalignment during a multipass printing, it is effective to establish the following two conditions. The first is to intermingle, in image data, overlapping dots and single dots in a predetermined ratio. The second is to maintain the above predetermined ratio and therefore the coverage ratio within a certain range in the event of print position misalignments.

The first condition can be met by using the dot arrangement patterns explained with reference to FIG. 9 and FIG. 6. More specifically, at level 2 and level 4 where density variations are feared to occur, overlapping dots and single dots are intermingled in a ratio of 1 to 1 (50% overlapping dots and 50% single dots). The level values at which overlapping dots and single dots are mingled and the ratio of the dot mingling may be adjusted by changing the dot arrangement pattern in many ways. The second condition can be met by giving features to the mask pattern used for a multipass printing. The bases for these conditions and the method of achieving them will be explained.

In a multipass printing which prints single unit areas in a plurality of print scans (first to fourth pass), the magnitude of density variations differs depending on between which two of the four passes the print position misalignment has occurred.

Figure 4:
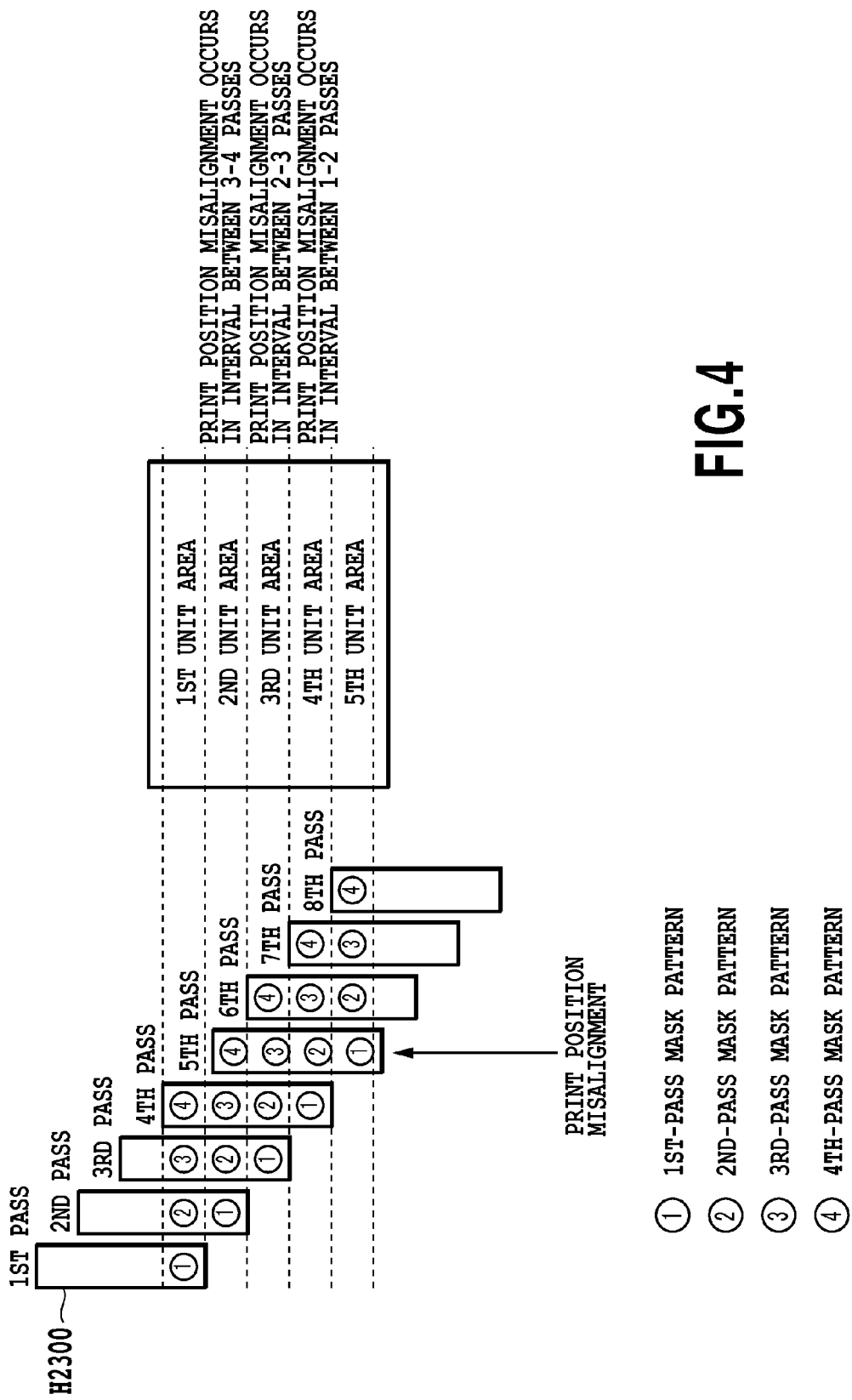
FIG. 4 is a schematic diagram for examining a magnitude of density change in individual unit areas when a 4-pass printing is performed.

FIG. 4 is a schematic diagram comparing the magnitude of density changes among individual unit areas when a 4-pass printing is performed. Here, a case will be explained in which 768 nozzles lined in a black nozzle array H2300 are divided into four groups of 192 nozzles and in which four mask patterns (mask pattern 1 to mask pattern 4) with print permission ratios of 25% are assigned one to each of the four nozzle groups. Print scans using the mask patterns 1 to 4 and a convey operation of advancing the print medium a distance equal to 192 nozzles are alternated repetitively so that a plurality of unit areas arranged in the subscan direction are printed one after another and progressively completed. In the figure, the relative positional relation is shown between the print head and the first to fifth unit area when a halftone image is printed uniformly on a print medium by executing first to eighth print scans. It is seen that the first unit area is formed with an image in the first to fourth print scan and the second unit area in the second to fifth print scan.

Here, let us consider a case where an unexpected positional shift has occurred in a convey operation performed between a fourth print scan and a fifth print scan. In this case, the first unit area has its image completed by the first to fourth print scan and therefore is not affected by the print position misalignment, resulting in no density changes. In the second unit area in which an image is completed in the second to fifth print scan, however, about 25% of the dots printed in the fifth print scan are printed out of alignment with the remaining 75% dots printed in the second to fourth print scan. In the third unit area in which an image is completed in the third to sixth print scan, about 50% of the dots printed in the third and fourth print scan and about 50% dots printed in the fifth and sixth print scan are printed out of alignment with each other. Further, in a fourth unit area in which an image is completed in the fourth to seventh print scan, about 75% dots printed in the fifth to seventh print scan are printed out of alignment with about 25% dots printed in the fourth print scan. A fifth unit area has its image completed in the fifth to eighth print scan and therefore, as with the first unit area, is not affected by the print position misalignment, producing no density changes.

As described above, in the event that a print position misalignment occurs during a print medium convey operation executed between the fourth and the fifth print scan, it is seen that a density change occurs in three unit areas, i.e., in the second to fourth unit areas. Further, in the second and fourth unit area, 25% of dots are not aligned with the remaining 75% of dots, whereas in the third unit area two groups of 50% of dots are printed out of alignment with each other. It is therefore seen that the third unit area is most affected by the print position misalignment. For example, if the above image is entirely made up of single dots, as explained with reference to FIGS. 1A and 1B, the third unit area experiences the largest density fall, followed by the second and fourth unit areas, in the event of a print position misalignment.

When a multipass printing that forms dots including overlapping dots is done, as in this embodiment, a significant density reduction, such as shown in FIG. 1B, does not occur even in the third unit area because there are locations where single dots overlap each other to form overlapping dots and those where overlapping dots separate into single dots. However, if such a multipass printing is performed using commonly available conventional mask patterns, the degree to which two single dots overlap each other lowering the coverage ratio, and the degree to which they separate raising the coverage ratio is not controlled. And these two changes in coverage are not necessarily kept constant. A study by the inventors of this invention has verified that, even if dot arrangement patterns such as shown in FIG. 9 are used, the use of commonly available conventional mask patterns still causes the phenomenon of density reduction in the third unit area when a miss-shift conveyance occurs unexpectedly. That is, a phenomenon has been observed in which the degree of density reduction becomes progressively alleviated in unit areas (second and fourth unit areas) located on both sides of a central unit area (third unit area) with the largest density reduction.

In the unit area with the greatest density reduction, the density reduction can be considered to have resulted because the degree to which the coverage ratio is lowered by two single dots overlapping each other in the event of a print position misalignment is greater than the degree to which the coverage ratio is raised by overlapping dots separating from each other. Therefore, in the above unit area, the density reduction can be expected to be prevented by making the degree to which the coverage ratio is raised by overlapping dots separating from each other greater than the degree to which the coverage ratio is lowered by two single dots overlapping each other.

For the above to be realized, in the unit area that exhibits the largest density reduction in the event of a print position misalignment (third unit area), two dots that form overlapping dots need to be printed, as practically as possible, in the two print scans that straddle the miss-shift conveyance operation. More specifically, it is desirable for there to be a high likelihood that overlapping dots in the third unit area are printed by a combination of one of the third and fourth print scans and one of the fifth and sixth print scans. In other words, it is desirable that, in a 4-pass printing in which a unit area is printed in four print scans, the number of overlapping dots printed in pairs of passes each straddling the interval between the second pass and the third pass (the central pass interval) needs to be greater than that of overlapping dots printed in pairs of passes straddling the interval of other consecutive print scans. At whatever timing a miss-shift conveyance occurs, this arrangement can alleviate density reduction in the unit area possessing this miss-shift conveyance between the second pass and the third pass (possessed at the central pass interval), in which the largest density reduction is feared to occur.

However, mask patterns prepared by conventional methods have no such characteristics.

Figure 7A:
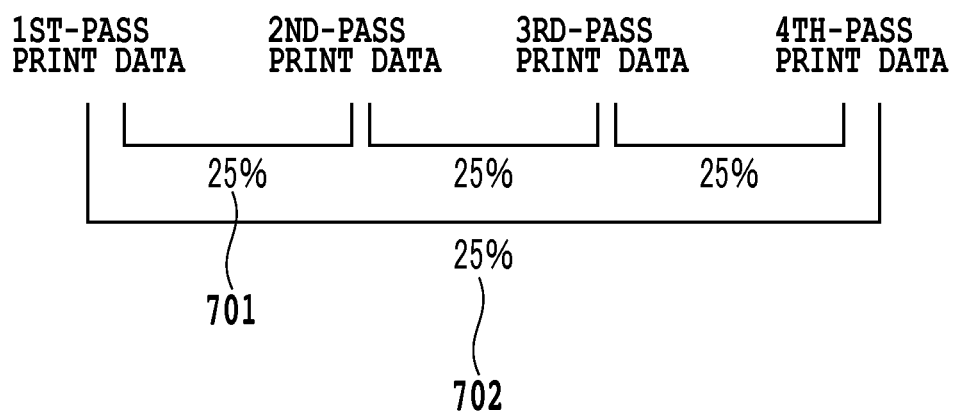
FIGS. 7A and 7B show percentages of overlapping dots printed in different combinations of two passes using the conventional mask pattern.
Figure 7B:
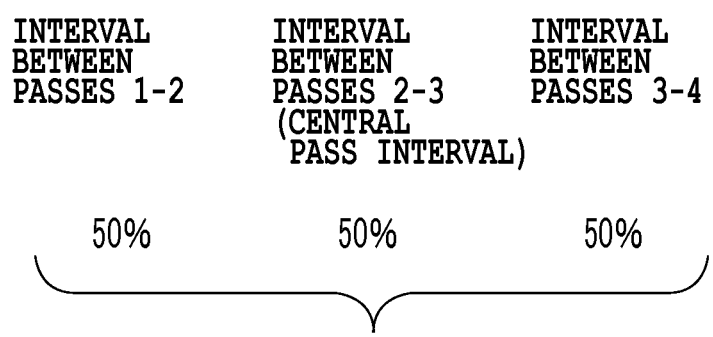

FIGS. 7A and 7B show percentages of overlapping dots that are printed in different combinations of two print scans (passes) by the above mask pattern prepared by the conventional method. Generally, a first pass and a third pass are complementary to each other, with a 50% print permission ratio each. It is the second pass and the fourth pass that can overlappingly print dots in the subpixels that are permitted to be printed in the first pass. In the conventional mask pattern, these two passes (second and fourth pass) are also allotted a half of the print-permitted subpixels each. As a result, the subpixels that are permitted to be printed in the first pass and the second pass together account for 25% (701) of the entire area of the mask pattern. Similarly, the subpixels that are permitted to be printed in a combination of the first pass and the fourth pass also account for 25% (702) of the entire area of the mask pattern. Proceeding with the discussion along this line, it is seen that every combination of two passes has the same print permission ratio of 25%, as shown in FIG. 7A.

Based on the print permission ratios shown in FIG. 7A, FIG. 7B shows the percentage of overlapping dots which is printed in pairs of passes each straddling the convey operations executed at the interval between each pass. For example, the percentage of overlapping dots printed in pairs of passes each straddling a convey operation executed between the first pass and the second pass is the sum of the percentage of overlapping dots printed in the first and the second pass and the percentage of overlapping dots printed in the first and the fourth pass. That is, 25%+25%=50%. The percentage of overlapping dots printed in pairs of passes each straddling the convey operation executed between the second pass and the third pass is the sum of the percentage of overlapping dots printed in the first and the fourth pass and the percentage of overlapping dots printed in the second and the third pass. Hence, 25%+25%=50%. Further, the percentage of overlapping dots printed in pairs of passes each straddling the convey operation executed between the third pass and the fourth pass is the sum of the percentage of overlapping dots printed in the first and fourth pass and the percentage of overlapping dots printed in the third and fourth pass. That is, 25%+25%=50%. As can be seen from the above, mask patterns prepared by conventional methods are not arranged such that more overlapping dots are printed in pairs of passes each straddling the convey operation at the central pass interval.

Figure 5:
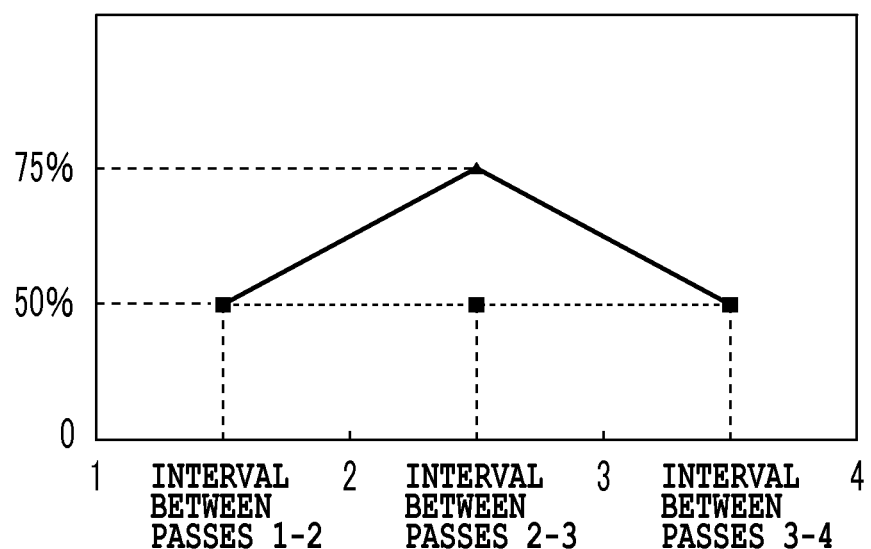
FIG. 5 is a diagram showing a comparison between a conventional mask pattern and a mask pattern of this invention in terms of percentages of overlapping dots that are printed in different combinations of two passes each straddling a different convey operation.

FIG. 5 shows a comparison between the above-described conventional mask pattern and the mask pattern of this embodiment described below in terms of the percentage of overlapping dots that, as explained in FIG. 7B, are printed in pairs of passes each straddle the convey operations that is performed at the interval between each pass. A dotted line represents the percentages of overlapping dots formed by the conventional mask pattern, showing that any group of overlapping dots printed in pairs of passes each straddling any particular convey operation has the same percentage of 50%. When such a printing is performed, it is feared that a density reduction is likely to occur in the unit area where a miss-shift conveyance has occurred between the second and third pass.

In this embodiment, on the other hand, a mask pattern is prepared which realizes the overlapping dot percentages indicated by the solid line of FIG. 5, i.e., a mask pattern that sets at 75% the percentage of overlapping dots printed in pairs of passes each straddling the central-pass interval. With this mask pattern used, density reduction in the unit area where the miss-shift conveyance has occurred between the second and third pass can be expected to be alleviated. The method of preparing this mask pattern having the above characteristic will be explained as follows.

Figure 11:
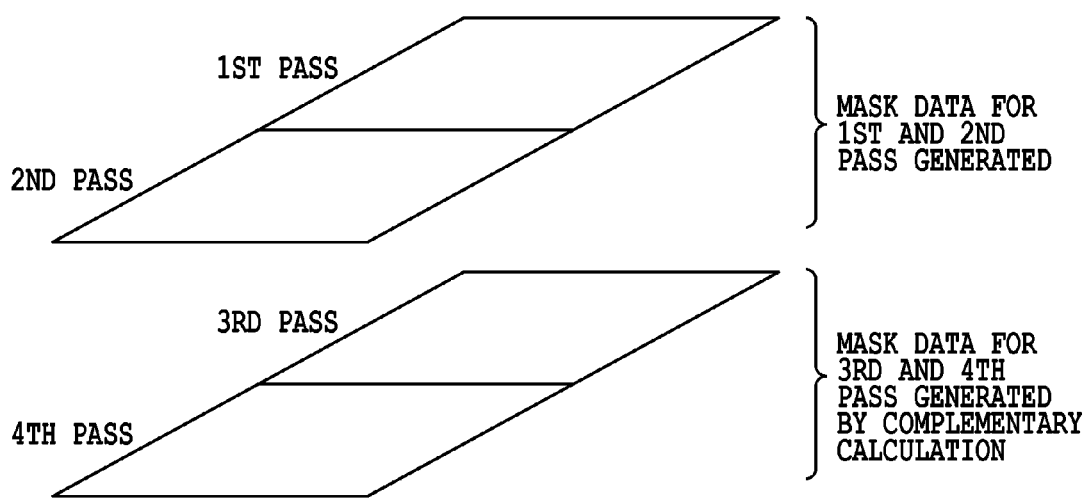
FIG. 11 is a conceptual diagram showing a procedure for making a mask pattern in an embodiment of this invention.

FIG. 11 is a conceptual diagram showing a process of making the mask pattern of this embodiment. First, a first-pass mask pattern and a second-pass mask pattern are completed, after which a third-pass mask pattern and a fourth-pass mask pattern that are complementary to the first- and second-pass mask patterns are formed. For the first pass and the second pass, confirmation of print-permission or non-print-permission for each subpixel is carried out with respect to a basic mask pattern prepared by conventional methods, and then the print-permitted subpixels are moved, as situation demands, for the mask pattern of this embodiment to have the characteristics of this invention.

Figure 12:
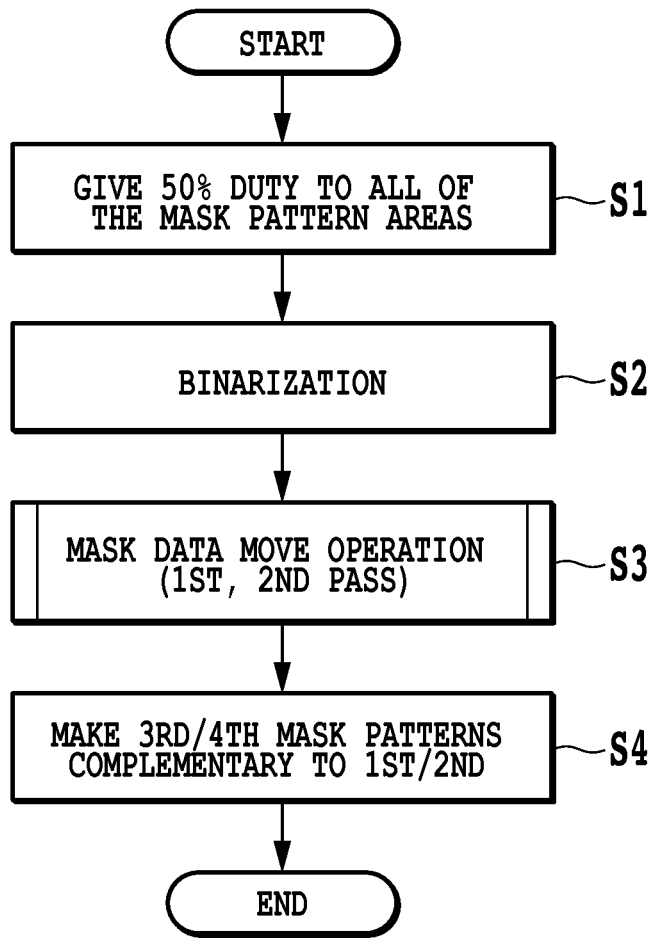
FIG. 12 is a flow chart for making a mask pattern used in an embodiment of this invention.
Figure 14:
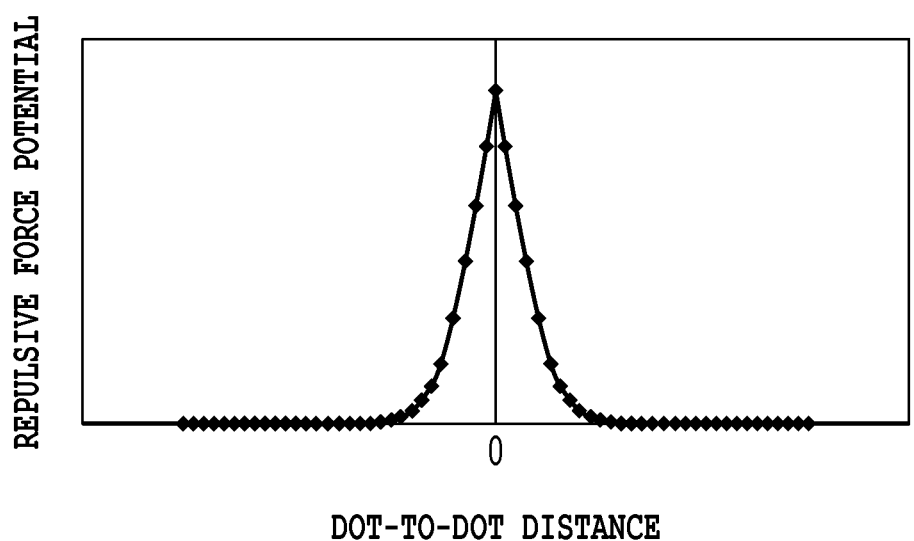
FIG. 14 shows how a repulsive potential acts on neighboring subpixels.

FIG. 12 is a flow chart showing the process of making the mask pattern used in this embodiment. First, step S1 gives a 50% duty to all of the mask pattern areas for the first pass and the second pass. Then, at step S2 a binarization operation is performed in which a preliminary decision as to whether to permit printing (1) or not permit printing (0) is made on all subpixels. For the binarization operation executed at step S2, this embodiment uses the method disclosed in Japanese Patent Laid-Open No. 2002-014552. More specifically, once one print-permitted subpixel is determined, a repulsive force potential such as shown in FIG. 14 is defined to act on neighboring subpixels. This is followed by an operation that determines the distribution of individual print-permitted areas in a way that keeps the repulsive force potential in a predetermined subpixel as low as possible. As a result, at step S2 a mask pattern is formed which has print-permitted subpixels scattered with a high dispersiveness.

In the next step S3, a mask data moving operation is executed. In the mask data moving operation, the first- and second-pass mask patterns are referenced to move some print-permitted subpixels so that the number of subpixels permitted to be printed in passes straddling a convey operation between the second pass and the third pass (the central-pass interval) falls within a predetermined range. This mask data moving operation determines the first- and second-pass mask patterns. Details of the mask data moving operation will be given later.

Step S4, based on the first- and second-pass mask patterns thus determined, makes third- and fourth-pass mask patterns which are complementary to the first- and second-pass mask patterns, respectively. That is, the third-pass mask pattern is a mask pattern that has the print-permitted subpixels (1s) and the non-permitted subpixels (0s) of the first-pass mask pattern reversed. Similarly, the fourth-pass mask pattern is a mask pattern that has the print-permitted subpixels (1s) and the non-permitted subpixels (0s) of the second-pass mask pattern reversed. With these steps executed, this mask data moving operation is complete.

Now, the mask data moving operation executed at step S3 will be detailed.

Figure 15:
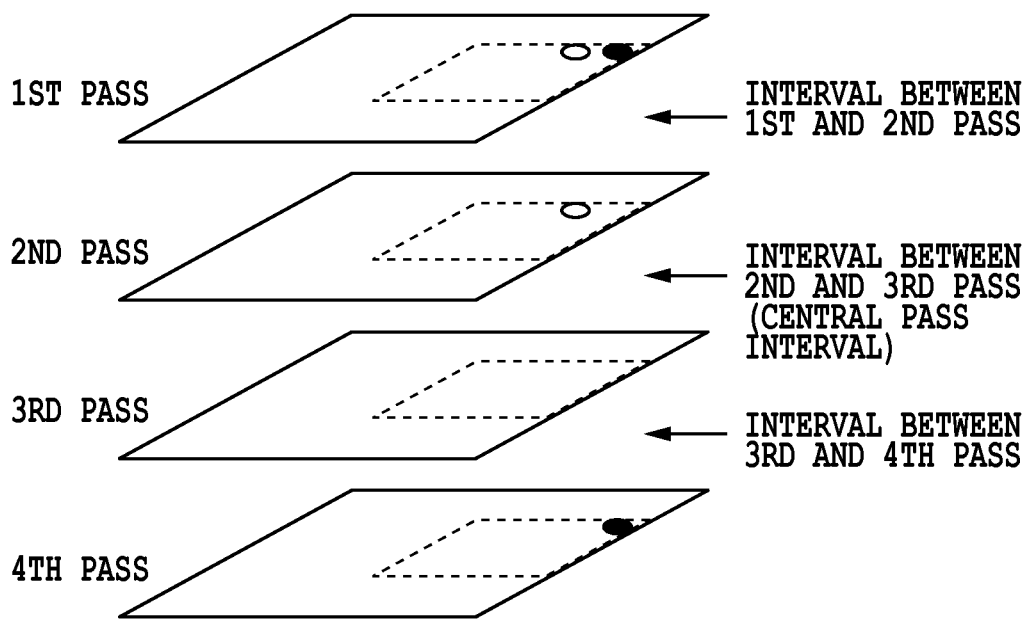
FIG. 15 is a schematic diagram showing a method of deciding whether or not to perform a moving operation on a print-permitted subpixels of interest in the mask data moving operation.

FIG. 15 shows how to decide on whether or not a print-permitted subpixel of interest needs to be moved during the mask data moving operation. In the figure, four mask patterns for first to fourth passes are shown overlapping each other. In this embodiment, the number of overlapping dots to be printed, straddling the interval between the second pass and the third pass (the central pass interval), are counted by checking the positions of the print-permitted subpixels in the first and second pass. For example, at the position of the black dot in the figure, let us suppose that the first-pass data is print-permitted data (1) and that the second-pass data is non-print-permitted data (0). In this case, since the second-pass mask data and the fourth-pass mask data are complementary to each other, the subpixel of interest (black dot position) is printed with overlapping dots in the first pass and the fourth pass. That is, this subpixel is printed with overlapping dots in passes straddling the central-pass interval and therefore becomes a counted object. At the position of a white dot in the figure, let us suppose that the first-pass data and the second-pass data are both print-permitted (1). In this case, the subpixel of interest (white dot position) is printed with overlapping dots in the first pass and the second pass. That is, since the paired passes that form the overlapping dots in this subpixel do not straddle the central-pass interval, this subpixel does not become a counted object.

Let us consider a case where, though not shown, first-pass data is non-print-permitted (0) and second-pass data is print-permitted (1). In this case, since the first-pass mask data and the third-pass mask data are complementary to each other, the subpixel of interest is printed with overlapping dots in the second pass and the third pass. That is, this subpixel is printed with overlapping dots straddling the central-pass interval and therefore becomes a counted object. Further, if first-pass data and second-pass data are both non-print-permitted (0), this area is printed with overlapping dots in the third pass and the fourth pass. That is, since the paired passes that form the overlapping dots in this subpixel do not straddle the central-pass interval, this subpixel does not become a counted object. Using the count value determined as described above, the mask data moving operation is performed.

Figure 13:
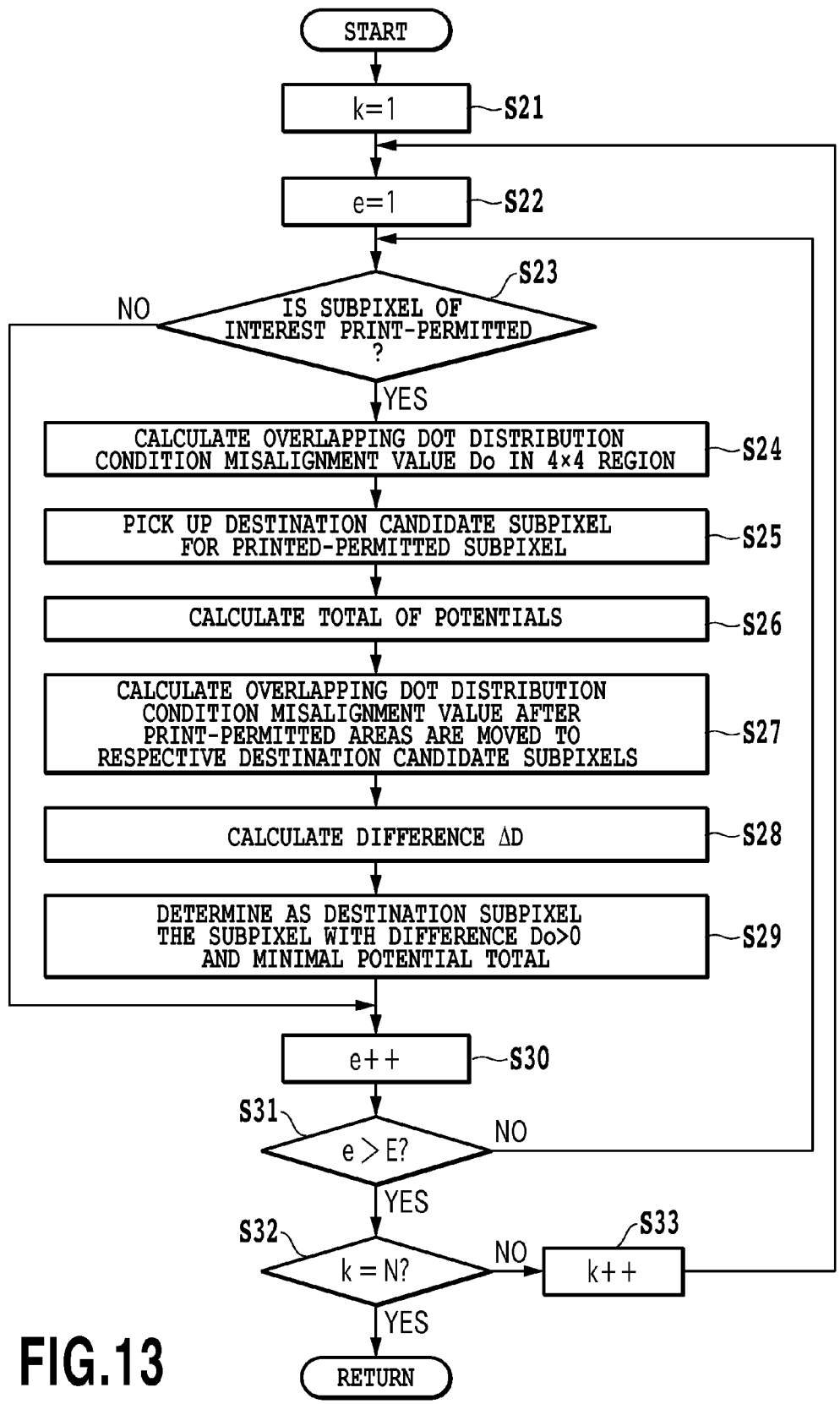
FIG. 13 is a flow chart showing steps in a mask data moving operation.

FIG. 13 is a flow chart showing the sequence of steps in the mask data moving operation. In this embodiment, the operation of moving a print-permitted subpixel, as described below, is repeated a plurality of times (here, N times) over an entire 1-pass mask pattern (192 subpixels×128 subpixels) to determine a final mask pattern. Thus, a parameter k to count, up to N, the number of operations executed over the entire mask pattern is prepared. At step S21 this value is set to 1.

Further, to execute the following operation on individual subpixels in the entire mask pattern, a parameter e is prepared to point to a subpixel of interest. At step S22, this value is set to 1.

At the next step S23, a check is made as to whether the subpixel of interest is permitted to be printed (1) in either the first-pass mask pattern or second-pass mask pattern. If the subpixel of interest is found to be permitted to be printed (1), the process moves to step S24. If the area is found to be not permitted to be printed (0), it jumps to step S30 where it proceeds to the next area for processing.

Step S24 determines by the above method the count value for a 4×4-subpixel section with the subpixel of interest in the central area and compares it with a preset target value. The target value is the ideal number of subpixels in the 4×4-subpixel section which are printed with overlapping dots in passes straddling the central-pass interval. In this embodiment, for example, the ideal area number is set at 12 subpixels, which is 75% of the 4×4 subpixels. At step S24, the absolute value of the difference between the target value and the actual count value is determined. This absolute value is taken to be an overlapping dot distribution condition misalignment value D0.

That is, as the overlapping dot distribution condition misalignment value D0 increases, the number of those subpixels in the 4×4-subpixel section, with the subpixel of interest in the central area, which are printed in passes straddling the central-pass interval, deviates away from the target value. Therefore, this embodiment performs in the following steps an operation of moving the print-permitted subpixels in the first-pass mask pattern and the second-pass mask pattern from the subpixel of interest to other subpixels so as to make closer to the target value the number of those subpixels that are to be printed with overlapping dots in passes straddling the central-pass interval.

Step S25 picks up candidate areas in the 4×4-subpixel section that can be made to be printed with overlapping dots in passes straddling the central-pass interval by changing non-print-permitted (0) subpixels to print-permitted (1) subpixels. More specifically, of the subpixels that are set as non-print-permitted (0) in the first pass, those that are set as print-permitted (1) in the fourth pass are picked up. Further, of the subpixels that are set as non-print-permitted (0) in the second pass, those that are set as print-permitted (1) in the third pass are picked up.

In the first-pass mask pattern, step S26 calculates, for each of the candidate subpixels, a total of repulsive force potentials in a predetermined region when the print-permitted area has been moved to one of the candidates. Similarly in the second-pass mask pattern, too, the total of the repulsive force potentials is calculated for each of the destination candidate subpixels. Here, the repulsive force potential is identical to the repulsive force potential that has been explained in step S2. The predetermined region refers to a region within a 10×10-subpixel range of the subpixel of interest and of the destination subpixel.

The next step S27 calculates, for each candidate subpixel, an overlapping dot distribution condition misalignment value D1 after the print-permitted subpixel has been moved to the candidate subpixel picked up by step S25.

At step S28, the overlapping dot distribution condition misalignment value D1 calculated by step S27 is subtracted from the overlapping dot distribution condition misalignment value D0 calculated by step S24, and the difference obtained is taken as ΔD.

Step S29 selects, from among a plurality of destination candidate subpixels picked up by step S25, a subpixel whose difference value ΔD calculated at step S28 is positive and whose total of potentials calculated by step S26 is minimal. This subpixel is determined as a destination subpixel.

Then, step S30 moves the subpixel of interest to the next candidate subpixel. The next step S31 checks if e>E, i.e., whether or not the above process has been done for up to the final subpixel of interest (e=E). If subpixels are found still remaining to be processed (e≦E), the processing returns to step S23.

On the other hand, if it is found that the above process has been completed for all candidate areas (e>E), the processing proceeds to step S32 where it checks if the above process has been performed over the entire mask pattern N times. If it is found that the number of times has not reached N (k<N), the parameter k is incremented, after which the processing returns again to step S22 where it further repeats the move operation on a newly prepared mask pattern. If on the other hand it is decided that k=N, indicating the mask data moving operation is completed, the processing returns to the flow chart of FIG. 12.

As described above, by making the mask patterns according to the steps explained with reference to FIGS. 12 and 13, the percentage of overlapping dots that are printed in passes straddling the central-pass interval can be made higher than the percentage of overlapping dots that are printed in passes that straddling other pass intervals, while maintaining a high level of dot dispersiveness.

Figure 8A:
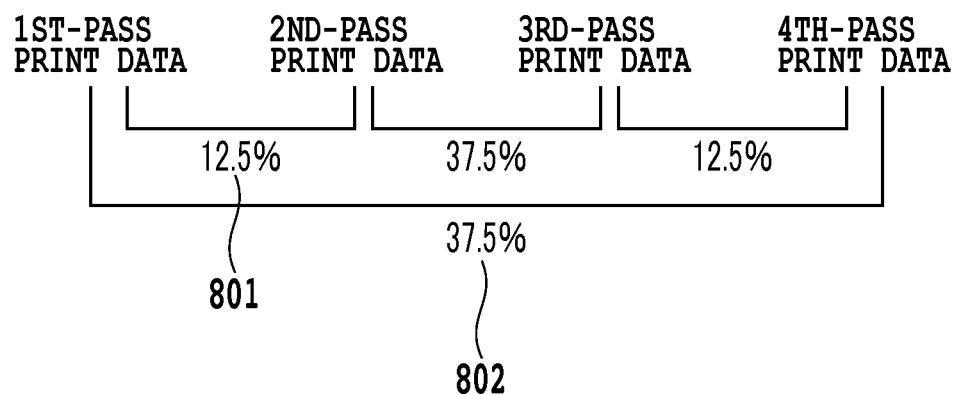
FIGS. 8A and 8B show percentages of overlapping dots printed in different combinations of two passes using the mask pattern of this invention, as compared with those of the conventional mask pattern.
Figure 8B:
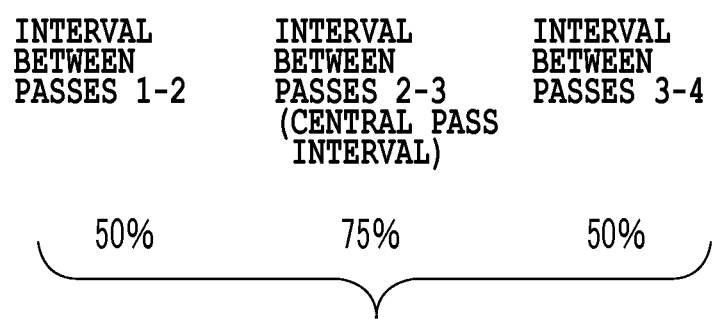

FIGS. 8A and 8B are diagrams showing percentages of overlapping dots printed in pairs of passes using the mask pattern prepared according to the method described above, as compared with those of the conventional mask pattern of FIGS. 7A and 7B. In this embodiment, the execution of the mask data move operation described above results in the subpixels print-permitted in the first pass and the second pass accounting for 12.5% (801) of the entire mask pattern, about half that of the conventional mask pattern shown in FIGS. 7A and 7B. Thus, the subpixels print-permitted in the first pass and the fourth pass occupy a correspondingly increased percentage of 37.5% (802) of the whole mask pattern, greater than that of the conventional mask pattern. Similarly, the subpixels print-permitted in the second pass and the third pass have an increased percentage of 37.5% of the whole mask pattern, whereas the subpixels print-permitted in the third pass and the fourth pass have a reduced percentage of 12.5%.

FIG. 8B shows, based on the percentages in FIG. 8A, the percentage of overlapping dots printed in passes that straddle the convey operations that is performed at the interval between each pass. From the figure, it is seen that the percentage of overlapping dots printed in passes that straddle the convey operation between the first pass and the second pass is the sum of the percentage of overlapping dots printed in the first and the second pass and the percentage of overlapping dots printed in the first and the fourth pass. Thus, 12.5%+37.5%=50%. The percentage of overlapping dots printed in passes that straddle the convey operation between the second pass and the third pass is the sum of the percentage of overlapping dots printed in the first and the fourth pass and the percentage of overlapping dots printed in the second and the third pass. Hence, 37.5%+37.5%=75%. Further, the percentage of overlapping dots printed in passes that straddle the convey operation between the third pass and the fourth pass is the sum of the percentage of overlapping dots printed in the first and fourth pass and the percentage of overlapping dots printed in the third and fourth pass. That is, 37.5%+12.5%=50%. Therefore, the distribution represented by the solid line of FIG. 5 can be realized. That is, the mask pattern of this invention can set the percentage of overlapping dots printed in passes straddle the central-pass interval (75%) higher than the percentages of overlapping dots printed in passes that straddle the convey operation interval between other consecutive passes (50%).

By executing a 4-pass printing using the dot arrangement patterns shown in FIG. 9 and the mask pattern prepared according to the above method, it is possible to acquire a uniform image with density changes kept low if an unexpected print position misalignment occurs.

While the above method has been described to use a 4×4-subpixel region, with the subpixel of interest at the central area, as the region for determining the count value and also a 10×10-subpixel region as the predetermined region for calculating the total of repulsive force potentials, these region sizes can of course be adjusted according to the size of the mask pattern as situation demands, along with the target value.

Other Embodiments

Although in the above explanations, a 4-pass printing has been taken up as an example, it should be noted that this invention can deal with a greater number of passes. For example, where an 8-pass printing is performed, mask patterns for odd-numbered passes—first, third, fifth and seventh pass—may be arranged to be complementary to one another with a print permission ratio of about 25% each. Mask patterns for even-numbered passes—second, fourth, sixth and eighth pass—may also be made complementary to one another with a print permission ratio of about 25% each.

In this case, too, the mask pattern can be prepared according to the flow chart of FIG. 12 and FIG. 13. It is noted, however, that in step S1 of FIG. 12, a 25% duty is given to all subpixels in the mask pattern regions not only for the first and second pass but also for first, third and fifth pass and for second, fourth and sixth pass. Then in step S2, the binarization operation needs to be done so that the first, third and fifth pass are exclusive of one another and that the second, fourth and sixth pass are also exclusive of one another.

Figure 16:
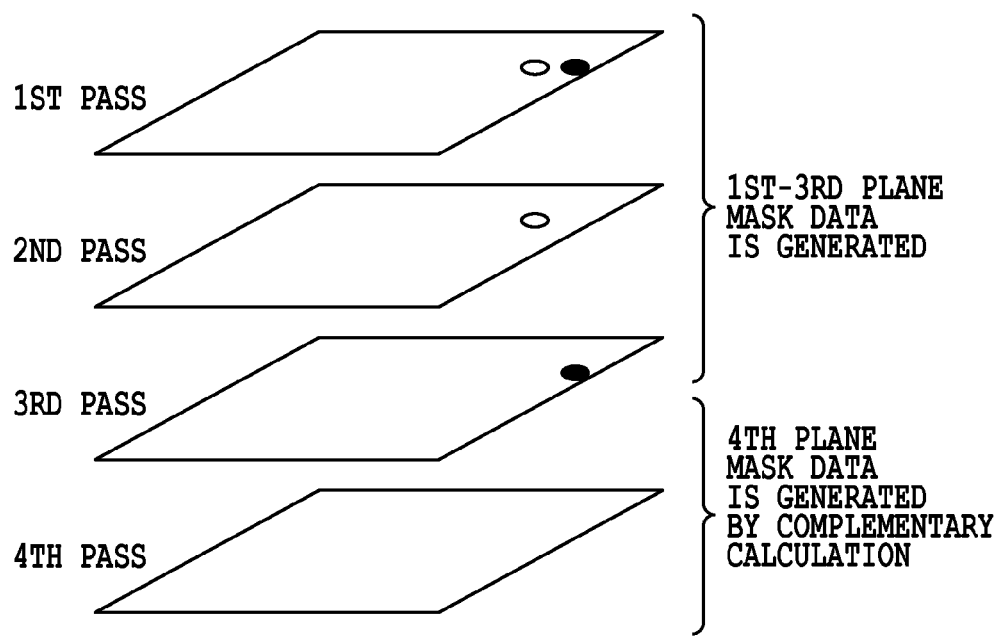
FIG. 16 is a conceptual diagram showing a relation among four mask patterns either for odd-numbered passes or for even-numbered passes.

FIG. 16 is a conceptual diagram showing the relationship among four mask patterns either for odd-numbered passes or for even-numbered passes. Step S2 executes the binarization operation to generate mask patterns for three passes (upper three planes) that are exclusive of one another.

Then in the mask data move operation of step S3, the interval between the fourth and fifth pass is taken as the central-pass interval and the print-permitted subpixel move operation is executed according to the above embodiment so that the predetermined number of subpixels are permitted to be printed in passes straddling the central-pass interval. Then at step S4, the last one plane of mask data (for a seventh or eighth pass) is generated so that it is complementary to other three planes.

The process to generate mask data based on the complementary relationship, as in step S4 of FIG. 12, does not necessarily have to be provided. All planes may be determined at one time by calculating repulsive force potentials. In this case, it is desirable to consider not only repulsive force potentials to scatter the print-permitted subpixels within the mask pattern for each pass with a high level of dispersiveness but also stronger repulsive force potentials to arrange the print-permitted subpixels in a way that makes the mask patterns for different passes exclusive of one another.

In any case, if a 2M-multipass printing is performed, where M is an integer equal to or more than 2, mask patterns satisfying the following conditions need to be used. That is, the number of subpixels permitted to be printed in passes straddling a central-pass interval between an Mth print scan (Mth pass) and an M+1st print scan ((M+1)st pass) needs to be greater than the number of subpixels permitted to be printed in passes straddling other consecutive print scans (passes).

Herein, print-permitted subpixels to be printed in passes straddling the interval between the Mth pass and the M+1th pass are those subpixels that are permitted to be printed in both the passes before the M+1th pass and the passes after the Mth pass. Also, when assuming that N is an integer differing from M, print-permitted subpixels to be printed in passes straddling intervals of two other consecutive passes are those subpixels that are permitted to be printed in both the passes before the N+th pass and the passes after the Nth pass.

Further, in the case of a 8-pass printing, if the degree of density variation in each unit area is considered, as in FIG. 4, the effects of density variation appear on a total of seven unit areas, with one having the most severe density variation located at the center and three on either side of it. It is expected that the density change will be greatest in the center unit area and progressively become lower as the unit area of interest moves away from the center unit area.

In this case it is preferred that, while setting highest the percentage of subpixels permitted to be printed in passes straddling the central-pass interval (the interval between Mth pass and (M+1)st pass), an arrangement be made such that, at the pass intervals on both sides of that, the percentage of the print-permitted subpixels progressively decreases while moving away from the central-pass interval. This will be explained in detail by taking up an example case of a 2M-pass (2M-print scan) printing as we focus our attention on (M±L) th print scan ((M±L)th pass), where L is an integer smaller than M. It is preferred that the percentage of subpixels permitted to be printed on a unit area in passes straddle the interval between (M−L) th pass and (M−L+1)st pass be less than the percentage of subpixels permitted to be printed in passes straddling the interval between (M−L+1)st pass and (M−L+2)nd pass and more than the percentage of subpixels permitted to be printed in passes straddling the interval between (M−L−1)st pass and (M−L)th pass. At the same time, it is also preferred that the percentage of subpixels permitted to be printed on a unit area in passes straddling a the interval between (M+L)th pass and (M+L+1)st pass be more than the percentage of subpixels permitted to be printed in passes straddling the interval between (M+L+1)st pass and (M+L+2)nd pass and less than the percentage of subpixels permitted to be printed in passes straddling the interval between (M+L−1)st pass and (M+L)th pass.

In the embodiments described above, it is preferred that the percentage of subpixels permitted to be printed in passes straddling the central-pass interval be adjusted according to the number of passes, the kind of print medium, ink color and the like. For example, the mask patterns prepared by the method of Japanese Patent Laid-Open No. 2002-014552 have so high a level of dispersiveness of print permitted subpixels that, in the event of a print position misalignment, the density easily decreases. So, by setting the aforementioned percentage high, density variations have been able to be prevented. However, commonly known conventional mask patterns do not always have a high level of dispersiveness and the degree of density variation in the event of a print position misalignment varies greatly depending on the kind of a basic mask pattern. Whatever the mask pattern, the aforementioned percentage needs only to be set so that the degree to which the coverage ratio is reduced by single dots overlapping each other in the event of a print position misalignment and the degree to which the coverage ratio is raised by overlapping dots being separated are somewhat stabilized. Further, two or more kinds of such mask patterns may be stored in the memory of the printing apparatus so that an appropriate one can be selected for use according to a print mode.

In the embodiments described above, by satisfaction of the first condition and the second condition, the capability of suppressing density variation due to unexpected conveyance errors was explained, but in the present invention the first condition need not necessarily be completely fulfilled. In other words, also in the case where at the time conveyance error arises the number of overlapping dots that separate and the number of single dots that overlap differ and the density becomes higher or lower, it is possible to decrease this density variation further than before by setting highest the ratio of subpixels that are permitted to be printed in passes straddling the central pass interval.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-087190 filed Mar. 31, 2009, which is hereby incorporated by reference herein in its entirety.

What is claimed is:

1. A printing control apparatus, comprising:
a determining unit configured to determine a pixel in which dots are printed in a unit area of a print medium by scanning a print head 2M times of the unit area to form an image, where M is an integer equal to or greater than 2; and
a print control unit configured to cause the print head to print a dot in the unit area,
wherein the determining unit sets a number of pixels, in which dots of the same color are printed, to be printed by both of the scan before the (M+1)th scan and the scan after the Mth scan, to be greater than a number of pixels, in which dots of the same color are printed, to be printed by both of the scan before the (N+1)th scan and the scan after the Nth scan, where N is a positive integer different from M and less than 2M.

2. The printing control apparatus according to claim 1, wherein the print control unit is configured to perform a printing operation such that the print medium is conveyed by a distance equivalent to the unit area in a direction crossing a scanning direction of the print head between each of the 2M scans.

3. The printing control apparatus according to claim 1, wherein
the determining unit sets a dot arrangement pattern that intermingles dots printed in a same pixel and single dots printed in a pixel singularly, at a predetermined ratio, according to a level value of image data corresponding to the unit area; and
the determining unit determines the scans for printing the dots printed in the same pixel and the single dot printed in the pixel singularly by using a mask pattern that defines a print permission pixel and a non-print permission pixel in the unit area.

4. The printing control apparatus according to claim 3, wherein the mask pattern consists of mask patterns for even numbered scans and mask patterns for odd numbered scans having a complementary relationship.

5. The printing control apparatus according to claim 3, wherein the dot arrangement pattern is configured such that the dots printed in the same pixel and the single dot printed in the pixel singularly are arranged with an even ratio.

6. The printing control apparatus according to claim 1, wherein the determining unit determines:
(i) a number of pixels, in which print dots of the same color are printed, to be printed in scans before an (M−L+1)th scan, where L is an integer smaller than M, and in scans after an (M−L)th scan to be smaller than a number of pixels, in which print dots of the same color are printed, to be printed in scans before an (M−L+2)th scan and in scans after the (M−L+1)th scan, and
(ii) a number of pixels, in which print dots of the same color are printed, to be printed in the scans before the (M+L+1)th scan and in scans after an (M+L)th scan to be greater than a number of pixels, in which print dots of the same color are printed, to be printed in scans before an (M+L+2)th scan and in scans after an (M+L+1)th scan.

7. The printing control apparatus according to claim 1, wherein the print head comprises a plurality of printing elements arranged to eject ink and form the dots on the print medium.

8. A printing control method, comprising the steps of:
determining a pixel in which dots are printed in a unit area of a print medium by scanning 2M times the unit area to form an image, where M is an integer equal to or greater than 2; and
controlling the print head to print a dot in the unit area,
wherein in the determining step, a number of pixels, in which print dots of the same color are printed, to be printed by both of the scan before the (M+1)th scan and the scan after the Mth scan, is set to be greater than
a number of pixels, in which print dots of the same color are printed, to be printed by both of the scan before the (N+1)th scan and the scan after the Nth scan, where N is a positive integer different from M and less than 2M.

9. The printing control method according to claim 8, wherein the print head is controlled such that the print medium is conveyed by a distance equivalent to the unit area in a direction crossing a scanning direction of the print head between each of the 2M scans.

10. The printing control method according to claim 8,
wherein, in the determining step, a dot arrangement pattern, that intermingles dots printed in a same pixel and a single dot printed in a pixel singularly, are set according to a level value of image data corresponding to the unit area at a predetermined ratio, and
wherein the scans for printing the dots printed in the same pixel and the single dot printed in the pixel singularly are determined by using a mask pattern that defines print permission pixel and non-print permission pixel in the unit area.

11. The printing control method according to claim 10, wherein the mask pattern consists of mask patterns for even numbered scans and mask patterns for odd numbered scans having a complementary relationship.

12. The printing control method according to claim 10, wherein the dot arrangement pattern is configured such that the dots printed in the same pixel and the single dot printed in the pixel singularly are arranged with an even ratio.

13. The printing control method according to claim 8, wherein the determining step sets,
(i) a number of pixels, in which print dots of same color are printed, to be printed in scans before an (M−L+1)th scan, where L is an integer smaller than M, and in scans after an (M−L)th scan to be smaller than a number of pixels in which print dots of the same color are printed, to be printed in scans before an (M−L+2)th scan and in scans after the (M−L+1)th scan, and (ii) a number of pixels in which print dots of the same color are printed, to be printed in the scans before the (M+L+1)th scan and in scans after an (M+L)th scan to be greater than a number of pixels, in which dots of the same color are printed, to be printed in scans before an (M+L+2)th scan and in scans after an (M+L+1)th scan.

14. The printing control method according to claim 8, wherein the print head comprises a plurality of printing elements arranged to eject ink and form the dots on the print medium.

* * * * *